(12) United States Patent
Mundra et al.

(10) Patent No.: US 11,630,692 B2
(45) Date of Patent: *Apr. 18, 2023

(54) EFFICIENT WORKER UTILIZATION

(71) Applicant: Oracle International Corporation, Redwood Shores, CA (US)

(72) Inventors: Tanvir Singh Mundra, Seattle, WA (US); Christopher Richard Newcombe, Kirkland, WA (US); Nathaniel Martin Glass, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/703,734

(22) Filed: Mar. 24, 2022

(65) Prior Publication Data

US 2022/0214916 A1 Jul. 7, 2022

Related U.S. Application Data

(63) Continuation of application No. 17/091,978, filed on Nov. 6, 2020, now Pat. No. 11,327,795.

(51) Int. Cl.
*G06F 9/48* (2006.01)
*G06F 9/50* (2006.01)
*G06F 21/44* (2013.01)
*G06F 11/30* (2006.01)

(52) U.S. Cl.
CPC ............ *G06F 9/4887* (2013.01); *G06F 9/505* (2013.01); *G06F 11/3051* (2013.01); *G06F 21/44* (2013.01); *G06F 2201/835* (2013.01); *G06F 2201/84* (2013.01); *G06F 2209/5018* (2013.01)

(58) Field of Classification Search
CPC .... G06F 9/4887; G06F 9/505; G06F 11/3051; G06F 2201/84; G06F 2209/5018
See application file for complete search history.

(56) References Cited

U.S. PATENT DOCUMENTS 9,274,902 B1 * 3/2016 Morley ............... G06F 11/0787
9,766,927 B1 * 9/2017 Islam ..................... G06F 9/4498
9,904,585 B1 * 2/2018 Islam ..................... G06F 11/079
(Continued)

OTHER PUBLICATIONS

U.S. Appl. No. 17/091,978, "Notice of Allowance", dated Jan. 31, 2022, 9 pages.

*Primary Examiner* — Benjamin C Wu
(74) *Attorney, Agent, or Firm* — Kilpatrick Townsend & Stockton LLP

(57) ABSTRACT

Techniques are disclosed for efficient utilization worker threads in a workflow-as-a-service (WFaaS) environment. A client device may request a workflow for execution by the client device. The client device may receive the requested workflow and initialize a set of worker threads to execute the workflow and a set of heartbeater threads to monitor the set of worker threads. Upon receiving an indication of a processing delay, the client device may capture the state of the workflow, suspend execution of the workflow, and store the workflow in a temporary queue. While the processing delay persists, the client device may use the set of worker threads to execute other tasks. When the processing delay terminates, the client device may resume execution of the workflow.

20 Claims, 9 Drawing Sheets

(56) References Cited

U.S. PATENT DOCUMENTS

| | | | |
|---|---|---|---|
| 10,367,676 B1* | 7/2019 | Vermeulen | H04L 41/30 |
| 11,327,795 B1* | 5/2022 | Mundra | G06F 11/3051 |
| 2009/0182610 A1* | 7/2009 | Palanisamy | G06Q 10/06 |
| | | | 707/600 |
| 2009/0327465 A1* | 12/2009 | Flegg | H04L 41/0803 |
| | | | 709/223 |
| 2011/0099146 A1* | 4/2011 | McAlister | G06F 11/2028 |
| | | | 707/634 |
| 2013/0166703 A1* | 6/2013 | Hammer | H04L 41/5045 |
| | | | 709/220 |
| 2016/0132214 A1* | 5/2016 | Koushik | G06F 8/61 |
| | | | 715/741 |
| 2021/0117251 A1* | 4/2021 | Cristofi | G06F 9/542 |

* cited by examiner

EFFICIENT WORKER UTILIZATION

CROSS REFERENCES TO RELATED APPLICATIONS

The present application is a continuation of U.S. application Ser. No. 17/091,978, filed Nov. 6, 2020, entitled "EFFICIENT WORKER UTILIZATION," the entire contents of which is incorporated by reference as if fully set forth herein, under 35 U.S.C. § 120.

BACKGROUND

Computational intensive applications are often made up of a set of processing tasks in which at least some may be executed independently and in parallel. Executing computation intensive applications on a computing device may consume an excessive amount of processing resources impacting other processes of the computing device, leading to longer execution times, and wasted processing resources. Therefore, there is a need in the art for improved methods and systems for executing computationally intensive applications.

BRIEF SUMMARY

Aspects of the present disclosure include a method for efficient worker utilization. The method comprises: transmitting, from a poller thread executing on a client device to a server, a request for workflow tasks; receiving, in response to the request for workflow tasks, a set of workflow tasks, each workflow task of the set of workflow tasks including a token, wherein the token includes a time-to-live (TTL) value; initializing a set of worker threads, each worker thread of the set of worker threads being configured to execute a workflow task of the set of workflow tasks; initializing, using the token of each workflow task, a set of heartbeater threads, each heartbeater thread of the set of heartbeater threads being configured to monitor an execution status of one or more worker threads; executing, by the worker threads, the set of workflow tasks; receiving an indication of a processing delay that prevents the set of worker threads from completing execution of the set of workflow tasks; suspending execution of the set of workflow tasks by the set of worker threads; adding the set of workflow tasks to a temporary workflow task queue; executing, by subset of worker threads, a different task during the processing delay; determining that the processing delay has terminated; and resuming, in response to determining that the processing delay has terminated, execution of the set of workflow tasks by the set of worker threads.

Another aspect of the present disclosure comprises a system comprising one or more processors and a non-transitory computer-readable media that includes instructions that when executed by the one or more processors, cause the one or more processors to perform the methods described above Another aspect of the present disclosure comprises a non-transitory computer-readable media that includes instructions that when executed by one or more processors, cause the one or more processors to perform the methods described above.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
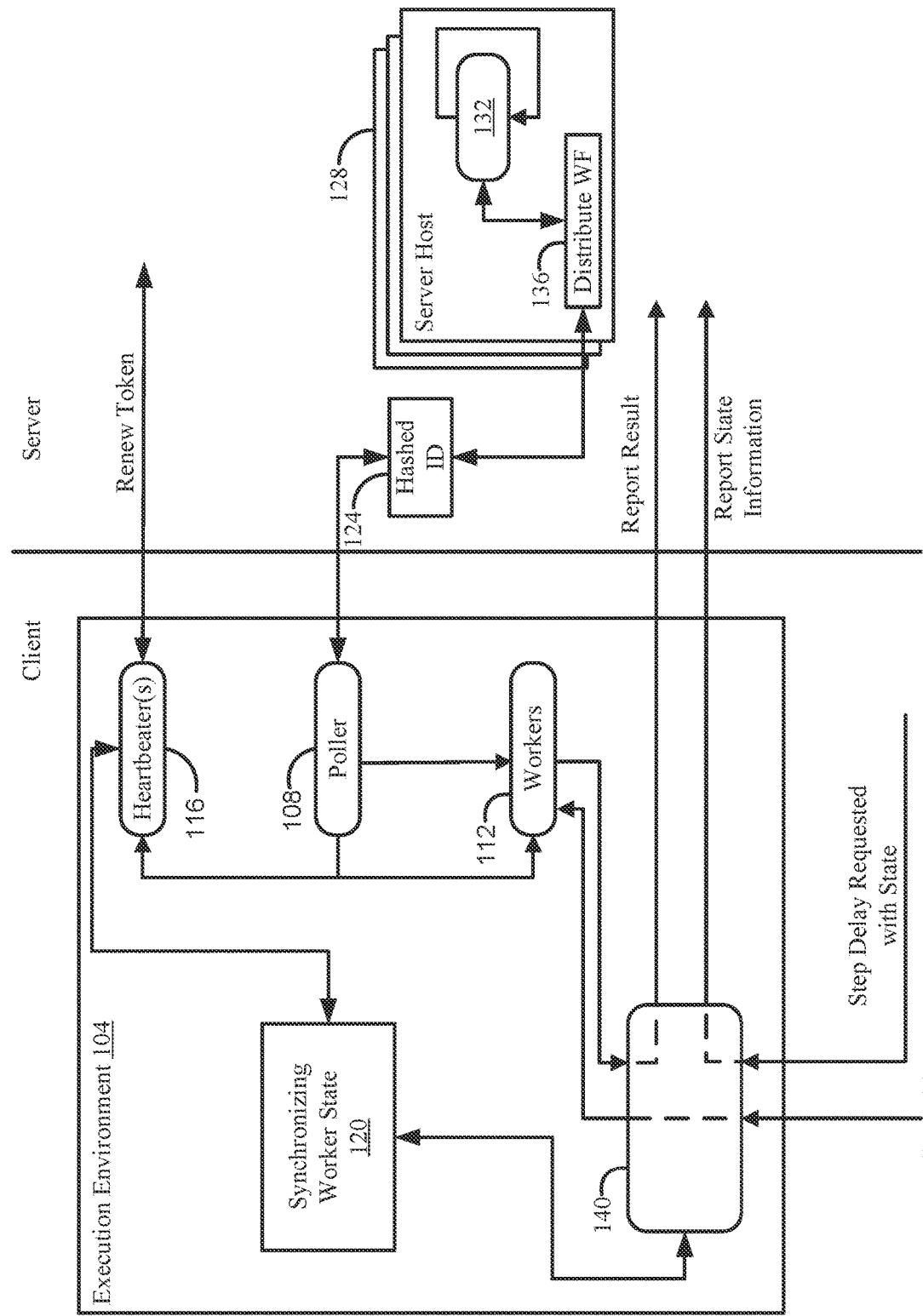
FIG. 1 is a block diagram of workflow-as-a-service system that distributes processing tasks to remote clients, according to certain embodiments of the present disclosure.

The methods and systems described herein involve workflow-as-a-service (WFaaS) in which workflow processing tasks may be distributed to one or more client devices within a distributed execution environment (e.g., such as a client/server based network, cloud network, or the like). Client devices may request a workflow task or a set of workflow tasks from a server for execution by the client device or by downstream devices (e.g., other client devices controlled by the client device). To prevent delays or deadlocks (e.g., processor stall, workflow task dependencies, memory lock contention, etc.), a lease (e.g., also referred to as a time-to-live (TTL) or lease TTL) may be assigned to each workflow task that represents a time interval in which the workflow task may execute. When the lease expires before the workflow task completes, the server may not accept the execution result. The client device can transmit a subsequent request for the workflow task (with a new lease) or another client device, when requesting a workflow or workflow tasks may receive the workflow task.

In some instances, client devices may link the transmission of requests for additional workflow tasks to the lease time interval. This enables the client device to request additional processing tasks each time the lease for each of a set of workflow tasks expires (e.g., due to the workflow tasks completing or otherwise returning to the server). Client devices may modulate the lease time interval to increase or decrease the frequency with which the client device transmits requests for additional workflow tasks to the server. Increasing the request frequency (e.g., reducing the lease time interval) may prevent the client device from being idle by obtaining additional workflow tasks more frequently at the cost of the lease of some workflow tasks expiring before those tasks complete. The client device may increase the lease time interval (e.g., reducing the request interval) to ensure that all requested workflow tasks have sufficient time to successfully execute at the expense of client device downtime (e.g., due to a time interval between completion of the workflow tasks and the subsequent request for additional workflow tasks).

In other instances, the client device may separate the transmission of requests for additional workflow tasks and the lease time interval. This enables the client device to request additional workflow tasks while other workflow tasks are still being processed by the client device to maintain a high processing load. For example, the client device may execute one or more poller threads that can request additional workflow tasks at a time just before a set of workflow tasks are expected to be completed by a corresponding set of worker threads (e.g., when the lease time interval has not yet expired). The client device may receive the new workflow tasks as the previous workflow tasks are returned to the server and assign the new workflow tasks to the now idle worker threads. Decoupling poller threads' requests for workflow tasks from the lease time interval increases worker thread utilization and reduces system downtime (e.g., idle worker threads). The client device may also include one or more heartbeater threads that execute to monitor the execution of one or more worker threads. If a worker thread is executing correctly, but the lease time interval for the workflow tasks being executed is about to expire, the heartbeater thread may renew the token assigned to each workflow task which includes the lease (e.g., restarting the lease time interval). This prevents the execution progress of the worker thread from being lost if the lease (time interval) expires.

Since the request for workflow tasks is decoupled from the lease time interval the poller thread may request additional workflow tasks at any frequency set by the client device and/or the server. For instance, the client device may define a dynamic polling frequency that is based on a snapshot of client device resource availability. For instance, the client device may obtain a snapshot of available processing resources that represents currently available processing resources of the client device (e.g., a quantity of idle worker threads and/or heartbeater threads, processing bandwidth, memory bandwidth, etc.). The client device may then request a set of workflow tasks that can be completed with the currently available processing resources. In some instances, the client device may transmit the snapshot to the server and the server may determine based on the snapshot the set of workflow tasks. The server may determine the set of workflow tasks based on a larger set of workflow tasks available at the server in the server's workflow queue. Additionally, or alternatively, the server may define a dynamic polling frequency based on a quantity of available workflow tasks or a frequency in which new workflow tasks are added to the server's work queue.

The client device may execute other operations while executing the workflow tasks. If the client device schedules a high priority operation for execution, the client device may pause execution of the workflow tasks. The client device may halt execution of the workflow tasks to free up the processing resources for executing the high priority operation. The client device may halt execution of the threads (e.g., some or all of the worker threads as needed to free up a minimum requested resources). In some instances, the poller threads and heartbeater threads may not be terminated. Since the workflow tasks are halted, the poller thread may not get additional work from the server and the heartbeater may have fewer (if any) worker threads to monitor. As a result, halting the worker threads may also reduce the processing resources consumed by the poller threads and heartbeater threads without having to halt the poller threads and heartbeater threads. The client device may return the workflow tasks to the server (e.g., using a ReportResult function with a predetermined value that is indicative to the server that execution of the workflow tasks by the client device is halted for a predetermined time interval). The server then marks the workflow tasks as being capable of being resumed by the client device (e.g., using a ResumeFutureWork function). The server returns the workflow tasks to the work queue (e.g., using a LeaseLoader function). When the high priority operation terminates, the poller thread of the client device may request the workflow tasks from the server (e.g., using a PollForWork function).

In some instances, the client device may reduce the processing resources consumed in halting execution of the workflow tasks (e.g., caused by returning the workflow tasks to the server and then requesting the workflow tasks again later) by storing the workflow tasks locally. For example, the client device may execute a client side yield with delay, in which the workflow tasks executed by the worker threads is returned to a temporary worker queue. The heartbeater thread communicates with the server to ensure the workflow tasks do not timeout (e.g., return to the server due to excessive execution time). The worker thread is now free to execute the high priority operation. When the high priority operation terminates, the client device redistributes the workflow tasks in the temporary worker queue back to the worker threads to resume execution of the workflow. This reduces the processing resources needed to return the workflow tasks only to have to re-request the workflow tasks, network resources (e.g., bandwidth, etc.) needed to transfer workflow tasks to and from the client device, and execution time by reducing downtime (e.g., non-executing time) of the client device waiting for the workflow tasks to transfer to the server or return from the server.

FIG. 1 depicts an example block diagram of workflow-as-a-service system that distributes processing tasks to remote clients, according to certain embodiments of the present disclosure. A workflow-as-a-service system includes one or more client-side devices that execute some or all (executable tasks) of a workflow and one or more server-side systems that manage the execution of workflows distributed client devices. The server environment may receive a workflow specification and/or metadata. The workflow specification may include an identification of one or more discrete workflow steps (e.g., tasks). The metadata may include additional information about the workflow. Examples of values included in the metadata can include, but are not limited to, expected overall workflow execution time, workflow name/identifier, major version, minor version, combinations thereof, or the like. Metadata may also include additional information associated with a workflow task such as, but not limited to, task name/identifier, version, expected execution time, heartbeat frequency, combinations thereof, or the like.

Workflow tasks may be executed within execution environment 104 of a client device. Execution environment 104 may correspond to an environment in which the client device executes any code (e.g., an environment that executes both local processes and workflow tasks). Alternatively, the client device may isolate execution environment 104 from local processes of the client device to prevent local processes from interfering with the execution of workflow tasks and workflow tasks from interfering with the local tasks. The client device may provision (volatile and/or non-volatile) memory that is isolated from local processes to provide a secure execution environment for the workflow tasks.

In some instances, execution environment 104 may be a virtual environment such as a virtual machine. The virtual machine may be configured based on the workflow tasks designated for execution by the client device. For example, a virtual machine may be configured to simulate a particular operating environment suitable for the execution of particular workflow tasks. For example, the virtual machine may be configured to simulate a particular instruction set architecture (e.g., x86, PowerPC, etc.), operating system, or the like.

The client device may execute multiple virtual machines with virtual machine including execution environment 104. Each virtual machine being configured for a particular workflow or workflow task to enable the client device to execute different workflow tasks in parallel. Alternatively, or additionally, the client device may provision one or more other client devices for execution of workflows or workflow tasks under the operation of the client device. Provisioning the one or more other client device may include instantiating one or more virtual machines on each of the one or more other client devices. The client device may then distribute workflows or workflow tasks received by the client device to each of the one or more other client devices and coordinate the execution of workflows or workflow tasks.

A hypervisor may be utilized to configure, instantiate, and/or manage virtual machines executing on the client device (and optionally the one or more other client devices). The hypervisor may be stored and executed by the client device, by each device executing a virtual machine, by the server, by another remote device, or the like. For example, the hypervisor may receive a specification of a particular operating environment and a target device. The hypervisor may then configure a virtual machine according to the particular operating environment and instantiate the virtual machine on the target device.

Execution environment 104 includes threads configured to assess current processing loads and request workflows, manage execution of workflows and workflow tasks, and execute workflows and workflow tasks. Poller 108 includes a thread that executes to identify a current processing load of the client device (e.g., by determining an amount of available memory, processor load, networking bandwidth, an amount of available workers 112, or the like). Poller 108 may generate a snapshot of the current processing resources of the client device and, based on the snapshot, determine whether to request additional workflow tasks and request workflow tasks that can be executed using the resources that are available. Poller 108 may generate the snapshot of the current processing resources of the client device at regular intervals, upon receiving a notification that a worker has completed execution, upon receiving user input, upon receiving input from a remote device such as the server, or the like.

For example, poller 108 may generate a snapshot at regular intervals (called the polling interval) as set by the client device, the server (e.g., server host(s) 128), or a user. Upon generating a particular snapshot, poller 108 may determine a quantity of available workers 112 that are currently available (e.g., not currently executing). If the quantity of available workers 112 is greater than a threshold quantity, then poller 108 may initiate a request for workflow tasks from the server. In some instances, poller 108 may request a particular set of workflow tasks based on the quantity of available workers 112. If the quantity of available workers 112 is not greater than a threshold quantity, then poller 108 may wait until the next polling interval and generate an updated snapshot. This process may continue for as long as the client device is configured to execute workflow tasks or until a high priority event is detected (e.g., a processing tasks that is higher priority than the workflow tasks). For example, if the client device has a high priority tasks scheduled for execution, the poller may be interrupted until the client device is ready to resume execution of workflow tasks.

Poller 108 may request workflow tasks by transmitting a poll token to server host 128. Server host 128 can include one or more distributed servers that distribute workflows to client devices. The poll token may include information identifying a workflow task or workflow task types. As an example, the poll token can include workflow name, workflow identifier, workflow type, workflow version (e.g., major version and/or minor version), priority, combination thereof, or the like. For instances, the poll token may be WorkflowName.Type, where "Type" can refer to the lease type or the particular task within the workflow specification. The poll token may include one or more wildcards to increase the likelihood that server host 128 is able to return workflow tasks to poller 108. For example, the wildcard may be used within the workflow type and/or the workflow version (e.g., in the major version and/or the minor version).

When the server receives the poll token, the poll token may be hashed using a hash function (e.g., consistent hashing function). Lease distribution unit 136 may use consistent hashing (e.g., using a particular hash function) to hash poll tokens (at 124) to route poll tokens to particular server hosts 128. Using the hashed value of the poll token, the poll token may be forwarded to a particular server host 128 that has the workflow tasks preloaded in a cache (e.g., lease loader 132).

The request with the poll token is received by workflow lease distribution unit 136. Workflow lease distribution unit 136 decodes the poll token to retrieve the requested workflows and passes the request to a particular lease loader 132. Lease loader 132 can search the workflow queue for available workflow tasks that correspond to poll token. Lease loader 132 may identify available workflows by name and/or by type depending on whether the poll token includes wildcards. For example, the poll token may include a workflow name and a wildcard for lease type such that lease loader 132 may return any workflow tasks that correspond to that workflow name regardless of lease type (e.g., any lease type). If a priority field is included, lease loader 132 may identify workflows that have higher priority and return those workflow tasks first. If the poll token does not include a priority field or if multiple tasks have the same priority, lease loader 132 may use a first come first serve algorithm in which lease loader 132 may identify the first workflow task that meets the poll token's criteria.

Server host 128 may include a lease token with each workflow task included in the identified workflow. The lease token can include an indication of a time interval over which the corresponding workflow task is to execute. During this time interval, the workflow task is considered "alive". The time interval prevents unexpected delays, or memory locks or deadlocks, processor stalls, or other processing faults from affecting the timely execution of the workflow. In the event that the time interval expires, the server may not accept the execution result and the workflow task may revert back to server host 128 for redistribution. Server host 128 may then distribute the workflow task back to execution environment 104 (if requested by poller 108) or to another poller thread of another client device. The lease token prevents one or more workflow tasks that fail to execute timely, from holding up the execution of the workflow.

Lease loader 132 may return the identified workflow task to workflow lease distribution unit 136. The identified workflow and corresponding leases may be transmitted back to poller 108 of the client device.

Upon receiving one or more workflow tasks from server host 128 (and verifying the integrity of the workflow using the poll token), poller 108 may initialize a set of threads for the execution of the set of workflow tasks that make up the workflow. The set of threads include worker threads (e.g., workers 112) and heartbeater threads (e.g., heartbeaters 116). Workers 112 include a pool of threads that execute workflow tasks. The client device may have any number of worker threads. In some instances, the quantity of worker threads is larger (and in some instances much larger) than the quantity of poller threads. Poller 108 may initialize a set of worker threads for execution of the received workflow tasks. Poller 108 may distribute some or all of the workflow tasks (e.g., depending on the quantity of available worker threads and/or the quantity of workflow tasks).

Heartbeaters 116 may include a pool of heartbeater threads that are each configured to monitor the status of worker threads. In some instances, each heartbeater thread monitors execution of one worker thread (e.g., one-to-one). In other instances, each heartbeater thread monitors execution of two or more worker threads (e.g., one-to-many) such that, when the client device is executing workflow tasks, the client device executes fewer heartbeater threads than worker threads. A heartbeater thread may continuously monitor worker threads to determine if a worker thread is executing properly (e.g., not stalled, waiting, subject to a memory deadlock, paused, or the like) and to ensure the worker thread completes execution within the lease time interval. Poller 108 may assign one or more worker threads to heartbeater 116 by transmitting (to heartbeaters 116) an identification of the one or more worker threads and the lease token that corresponds to the workflow task distributed to the one or more worker threads. The heartbeater uses the lease token to ensure that execution of the workflow tasks by the one or more worker threads does not exceed the lease time interval.

As the lease time interval approaches expiry, the heartbeater thread may determine if additional time is needed for the worker thread to finish executing. For example, the heartbeater thread may determine an execution status of the worker thread and or workflow task and determines additional time is warranted, the heartbeater thread may renew the token by transmitting a request to the server with the token associated with the workflow task being executed by the worker thread. The server may validate the token and issue an updated and/or new token with an extended validly (e.g., a new or extended time interval).

If execution of a worker thread exceeds the maximum allowed time interval of the lease, the responsible heartbeater thread may execute corrective action to prevent the workflow task from impacting execution of the entire workflow. For example, a worker thread may encounter a fault (e.g., unexpected delay, memory deadlocks, processor stalls, etc.) that causes the worker thread to execute for a time interval that is longer than the maximum lease time interval allowed. When a lease time interval expires, the heartbeater thread may determine whether the worker thread is still executing. If the worker thread is executing, the heartbeater may interrupt the worker thread and halt the execution of the worker thread. The heartbeater thread may prevent a worker thread from executing indefinitely and holding up other workflow tasks or wasting processing resources of the client device.

The heartbeater thread may determine to stop renewing the lease at any time (e.g., detecting a processing fault at the worker thread and at expiration of the lease time interval, detecting an improbable or incorrect execution result, or the like). In other instances, the heartbeater thread may terminate the worker thread and discard the lease token. Upon expiration of the lease time interval, the workflow task automatically reverts back to server host 128 for reassignment to the client device (upon request by poller 108) or to another client device (upon request by a poller of that client device).

Heartbeaters 116 may request to renew lease tokens to keep workflow tasks alive during operations that pause the execution of workflows, such as, higher priority processing tasks, local processing tasks, status checks (of other client devices, downstream devices, managed devices, or the like). For example, when the client device executes a client-side delay (e.g., to assess the status of downstream workflow devices or when a device requests the status of the client device), execution of the workflow by workers 112 may be paused. The workflow tasks currently being executed may be stored in a temporary workflow task queue (e.g., which stores state information of the workflow tasks and/or the worker threads executing the workflow tasks).

Heartbeaters 116 may generate a request to renew the lease tokens of all paused workflow tasks so that the lease time interval of the paused workflow tasks does not expire. With the workflow paused (and queued), the client device may use the freed processing resources to execute the client-side operations. For local processing tasks, the client device may shift processing resources from execution environment 104 and allocate those resources to the local processing tasks. For client-side delays, execution environment 104 may utilize the now available worker threads to execute other processing tasks. When the client-side delay terminates, the temporary workflow task queue is used to redistribute the paused workflow tasks back to workers 112. The temporary workflow task queue also transfers the state information of each workflow task (and/or the state of the worker thread executing the workflow task) such that workflow tasks can be resumed at the point in which execution was paused to prevent loss of processing.

Work-item executor 140 is responsible for executing workers 112. Work-item executor 140 may also manage interrupts and delay requests received from the local execution environment of the client device (e.g., such as processor interrupt), from server host 128, user input, from other devices, and/or the like. For example, when the client device executes a client-side delay, work-item executor 140 pauses execution of workers 112 and causes the workflow tasks to be transferred to the temporary workflow task queue. Work-item executor 140 may then execute worker threads of workers 112 that are configured for other tasks until the client-side delay terminates. Work-item executor 140 may also receive external delays from server host 128 and/or other devices. Work-item executor may follow the same process for facilitating external delays and resuming execution upon the termination of external delays. For external delays, work-item executor 140 may transmit the state information to the device requesting the delay to provide an indication of the state of the workflow execution.

Heartbeaters 116 monitor the execution of workers 112 by work-item executor 140 by storing the state information of workers 112 as workers 112 execute. Heartbeaters 116 may store the state of each worker thread as it executes. Heartbeaters 116 may synchronize (e.g., at 120) the state of each worker thread (e.g. stored by the heartbeater) with the current state of the worker thread reported by work-item executor 140. Heartbeaters 116 may synchronize states continuously (e.g., in regular intervals), in real-time, each time a state transition occurs (e.g., as reported by work-item executor 140), or upon request.

When a step execution completes, (e.g., when a worker thread terminates successfully), work-item executor 140 may store the result of the execution locally within memory of the client device and report the results to server host 128. The client device may aggregate the results of each workflow task in the workflow to generate a workflow final result. The workflow result may be transmitted to server host 128.

Figure 2:
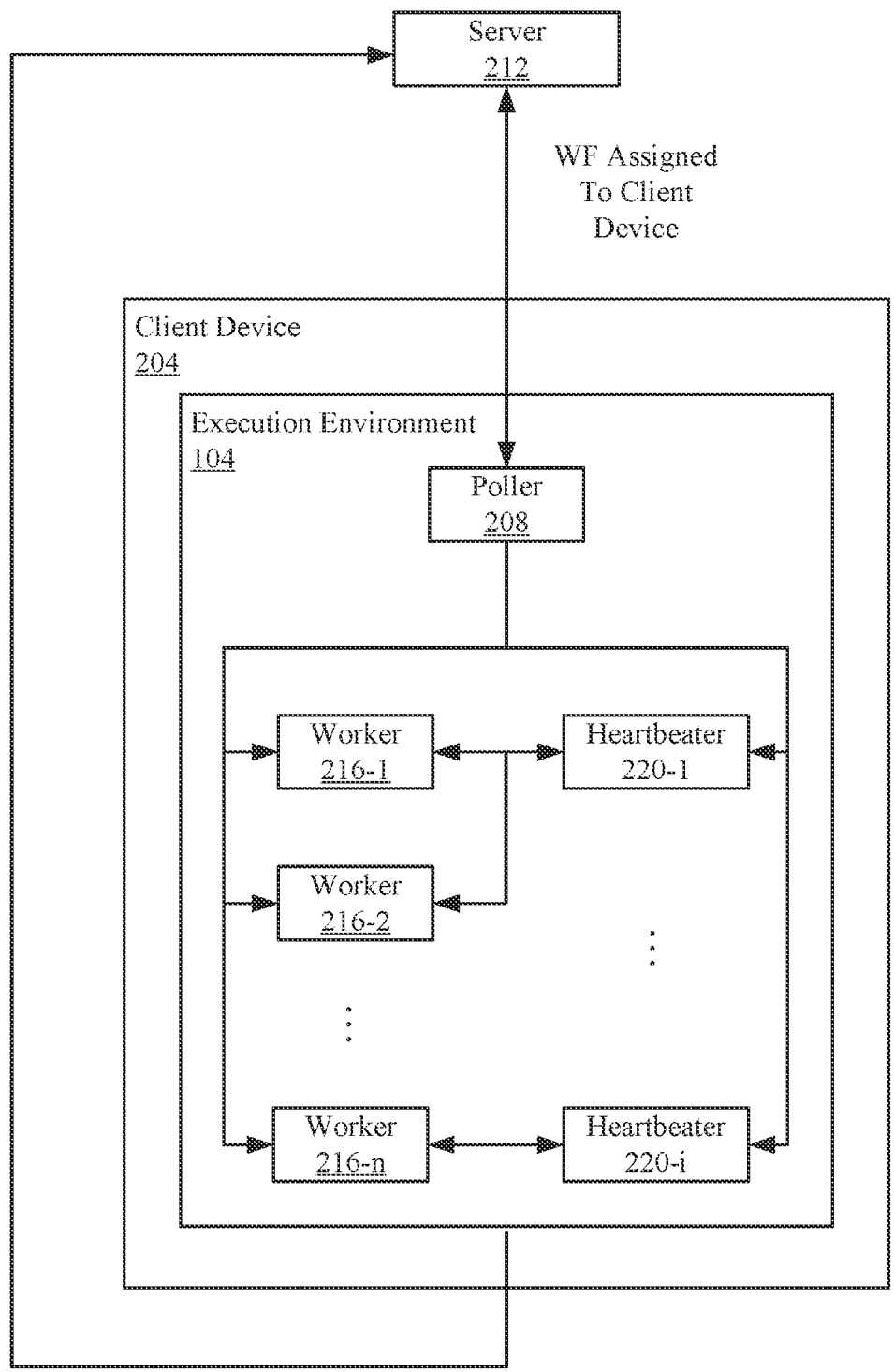
FIG. 2 is a block diagram of client-side execution of distributed workflows, according to certain embodiments of the present disclosure.

FIG. 2 is a block diagram of client-side execution of distributed workflows, according to certain embodiments of the present disclosure. Client device 204 may operate one or more execution environments (e.g., such as execution environment 104 of FIG. 1) configured to execute workflows. The one or more execution environments may be environments that are isolated from the local environment of the client device (e.g., the environment that establishes the one or more execution environment and executes non-workflow operations). The client device may instantiate each execution environment to operate independently from the other execution environments and the local execution environment of the client device. For instance, the client device may allocate a predetermined set of processing resources to each execution environment to enable each processing environment to execute workflow tasks. Since the processing resources are allocated when each execution environment is instantiated, the processing load of other execution environments (including the local environment of the client device) may not affect the ability of an execution environment to execute an assigned workflow.

Client device may perform resource allocation (e.g., of processing, memory, and/or network resources) when an execution environment is instantiated. Resource allocation may be based on a current processing load of the client device, an expected processing load of the client device, a number of execution environments instantiated, type of workflow to be executed, and/or the like). Resource allocation may be determined by the client device, execution environment being instantiated, a server (e.g. such as server host 128), user input, or the like. In some instances, modification to resources allocated to an execution environment may be restricted to during instantiation and before and/or after execution of a workflow. Resource allocation may be restricted while an execution environment is executing a workflow to prevent impacting the execution of the workflow. In other instances, the execution environment may request additional resources while executing a workflow. In those instances, the resources allocated to the execution environment may be increased but may not be decreased while the execution environment is executing a workflow. In still yet other instances, modifications to the allocated resources may occur at any time (e.g., during instantiation or runtime).

Execution environment 104 instantiates poller 208, a thread that is configured to manage acquisition of workflows for execution environment 104, with a polling frequency value.

The polling frequency value indicates a frequency in which poller 208 is to request workflows from server 212. The polling frequency value may indicate that poller 208 is to execute a request for new workflow tasks in regular intervals (e.g., every 'x' milliseconds), upon detecting the occurrence of a condition or event (e.g., when resources of execution environment are below a predetermined threshold, predetermined quantity of worker threads are available for execution, receiving user input, receiving input from another client device or server 212, or the like) or the like.

Poller 208 requests a new workflow task for execution from server 212 by transmitting a poll token that includes an identification of a workflow. The identification of the requested workflow may include multiple period-delineated operands such as, but not limited to, an identifier, a major version, a minor version, a type, a time interval, a quantity of available worker threads (e.g., based on current processor load, memory capacity, network bandwidth, etc.), combinations thereof, and the like. For example, the identification of the workflow may be: "Workflow.3.1", which corresponds to a workflow with an identifier of "Workflow", a major version '3', and a minor version '1'. Server 212 may determine if there is a matching workflow in the available workflow queue. In some instances, server 212 may return a workflow that is an exact match. If server 212 cannot identify a workflow that matches, server 212 may return an indication that the requested workflow is unavailable or could not be found and that the client should poll later, or the like. In other instances, server 212 may identify the closest workflow that matches the request. For example, server 212 may identify any workflow with a same identifier and major version but having any minor version. In those instances, server 212 may not identify workflows with different identifiers or different major versions as these workflows may not be executable by execution environment 104.

In other instances, poller 208 may use wildcard operators to specify the requested workflow. The wildcard operator may be included within one or many of the operands (e.g., the major version, minor version, type, and/or the like) to indicate that the operand itself or the portion of the operand at the location of the wildcard operator can correspond to any workflow. For instance, poller 108 may provide "Workflow.3.*" where '*' is a wildcard operator indicating that server 208 may identify any workflow having the identifier "Workflow" with a major version of '3' and having any minor version (as indicated by the wildcard operator. As another example, poller 108 may provide "Workflow.3.1.*". In that example, server 208 may identify any workflow having an identifier "Workflow" and having specified major version (i.e. '3') and minor version (i.e. '1') and any type (Step). The wildcard operator enables the server to identify a larger quantity of potential workflow tasks that can satisfy the request. As a result, it may be more likely that the server does identifies a suitable workflow task that will satisfy the request (and less likely that server 212 fails to return a workflow task). Since the wildcard operator increases the number of workflow tasks that may satisfy the request, it reduces the time that execution environment 104 is idle or is underutilized (e.g., due to the client device waiting for a workflow to execute) and at the same time increases system utilization and efficiency.

Workflows distributed by server 212 include a set of workflow tasks. Each workflow task may be a discrete portion of the workflow that is executable by one or more threads of an execution environment. When server 212 receives a poll token, server 208 identifies the requested workflow and initializes a set of tokens for the workflow tasks of the workflow. A token is initialized for each workflow task in the set of workflow tasks. In some instances, server 212 may also generate a time-to-live (TTL) value (also known as a lease validity value), which represents a time interval within which a heartbeater thread is to renew the lease. The TTL value may be determined by the workflow specification.

Server 208 then transmits the set of workflow tasks, the set of tokens, the TTL value to execution environment 104 of client device 204. Server 208 may later deserialize the token to authenticate token renewals or reported results. Poller 208 receives the set of workflow tasks and initializes a set of worker threads (worker 212-1-212-$n$) to execute the set of workflow tasks and a set of heartbeater threads (heartbeater 220-1-220-$i$) to monitor execution of the worker threads. Execution environment 104 may include 'n' worker threads (where n is an integer that is greater than 2). Execution environment 104 may include T heartbeater threads (where T is an integer that is greater than or equal to 1 and less than 'n'). In other words, execution environment includes a set of 'n' worker threads that is larger than a set of 'i'' heartbeater threads. Generally, each heartbeater thread monitors the execution of two or more worker threads. Execution environment 104 may execute less heartbeater threads than the quantity of worker threads that are allocated to execute the set of workflow tasks.

For example, the set of workflow tasks includes 'n' workflow tasks. Poller 208 may instantiate 'n' worker threads (worker 216-1-216-$n$) such that each worker thread is configured to execute a workflow task. Execution environment 104 also instantiates T heartbeater threads where T is less than 'n'. As shown, a first heartbeater thread (220-1) monitors execution of two worker threads (e.g., 216-1 and 216-2 as shown). The last heartbeater thread (220-$i$) monitors the remaining worker threads that are not being monitored by a heartbeater thread. This heartbeater thread (220-$i$) may monitor worker 216-$n$. Heartbeater threads may automatically load balance between heartbeater threads to ensure that tokens remain valid. For instance, the heartbeater thread may automatically load balance such that each heartbeater thread monitors approximately a same quantity of worker threads as other heartbeater threads.

The heartbeater threads ensure the worker threads execute in a timely (e.g., terminate successfully within the TTL value). If the time interval expires before the worker thread terminates successfully, the results of the execution may not be accepted by server 208. Instead, server 208 may redistribute that workflow task upon receive a subsequent request for a workflow. The workflow task may be requested by client device 204 or by another client device. In some instances, the worker thread is terminated as soon as the time interval expires to prevent wasting processing resources of client device 204.

Execution environment 104 transmits the results of each workflow task to server 208 along with the token. Server 208 may verify that the workflow task results are authentic (e.g., were received from a device authorized to execute the workflow). Server 208 may authenticate the workflow task result by deserializing the token the token received from client device 204. If the token is valid, then it can be determined that the workflow task result was generated by the client device that was assigned to execute the workflow task (i.e. an authorized device). If the token is invalid, server 208 may discard the workflow task result and reissue the workflow task to client device 208, another client device, or to the first device that requests a workflow). Once each of the workflow task results are received, server 208 may aggregate the individual workflow task results to generate a workflow result. The workflow result is available to be transmitted to the device or user that defined the workflow for inspection at a later time.

Figure 3:
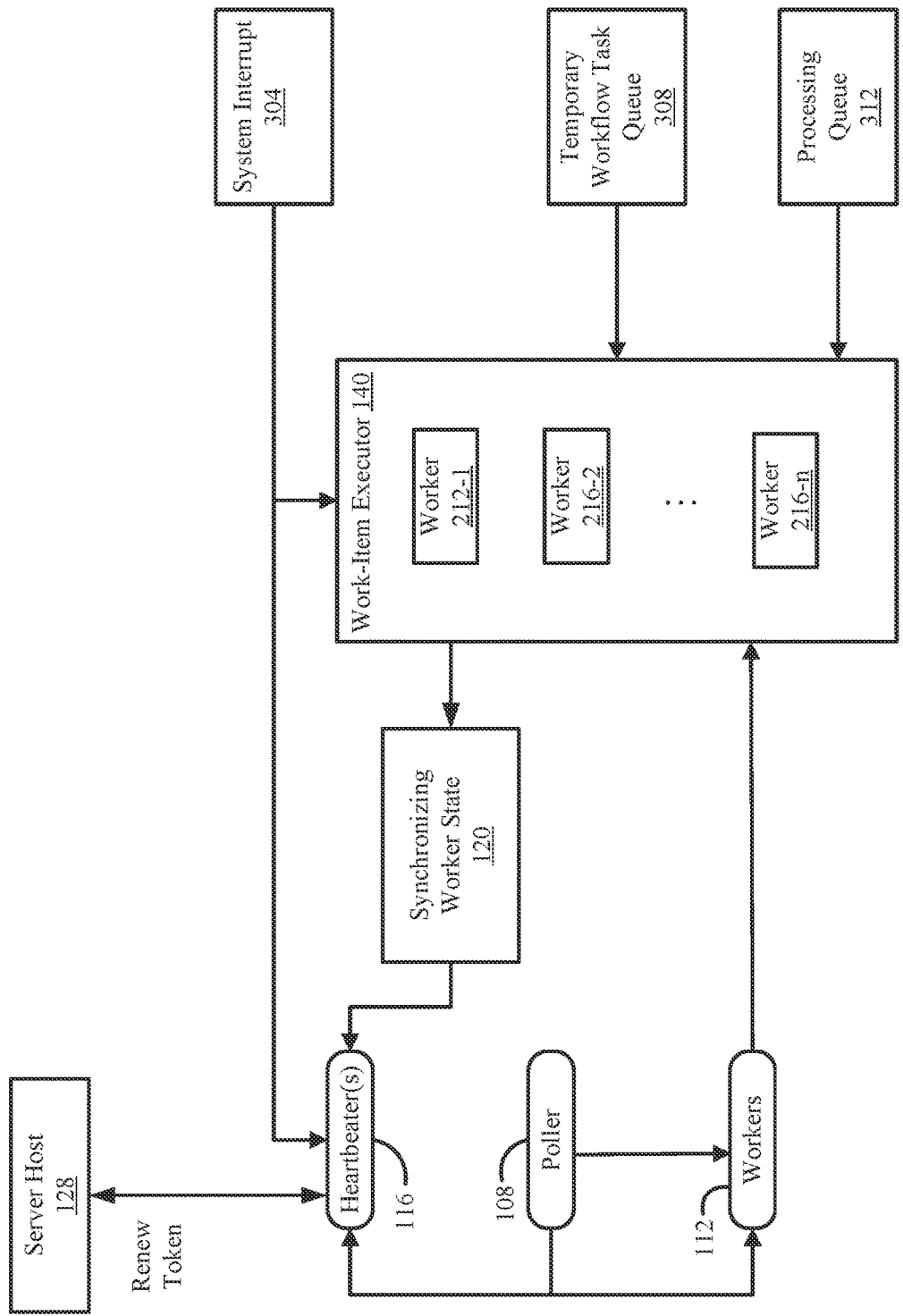
FIG. 3 is a block diagram of efficient worker utilization during client-side execution of distributed workflows, according to certain embodiments of the present disclosure.

FIG. 3 is a block diagram of efficient worker utilization during client-side execution of distributed workflows, according to certain embodiments of the present disclosure. A client device and/or execution environment that executes workflow tasks may also execute other processes (e.g., local processes, management processes associated with downstream or upstream devices, high priority tasks including other workflow tasks, combinations thereof, and the like). In some instances, execution of other processes may interfere with the execution of the set of workflow tasks. For instance, a local process may require resources currently allocated to execute workflow tasks. In other instances, the execution environment of a client device may execute a delay (of the execution of the workflow) for a non-processing operation such as a status check of a downstream device (e.g., a device that is operated or managed by the client device) or an upstream device (e.g., a device that operates, manages, or distributes workflows to the client device).

When a local process, high priority process (e.g., higher priority than a priority assigned to the executing workflow), or delay occurs, the execution environment may temporarily suspend execution of the workflow. The execution environment may suspend execution of the workflow and divert processing resources allocated to the execution environment to the local or high priority process. During a delay operation, the execution environment may suspend execution of the workflow to prevent loss or waste of processing resources in the event of a negative status (e.g., device unreachable, network failure, assigned workflow has been canceled, system or software fault, etc.) being returned. Since the delay does not necessitate that the processing resources allocated to the execution environment be diverted elsewhere, the execution environment may retain the allocated processing resources.

For example, work-item executor 140 (e.g., as described in connection with FIG. 1) may execute a workflow using 'n' worker threads (212-1, 212-2,-212-$n$), each worker thread executing a workflow task of the workflow. When work-item executor 140 detects system interrupt 304, work-item executor 140 suspend execution of the workflow and stores an identification of each suspended workflow task in temporary workflow task queue 308. Temporary workflow task queue 308 also stores the state of each suspended workflow task. The state of a workflow task indicates the point of execution of the workflow tasks including the current value of any variables. In some instances, the point of execution may refer to the last line of code of the workflow task that executed or the next line of code that is to execute.

At each heartbeat time interval (e.g., lease TTL value), heartbeaters 116 may synchronize (at 120) the state of each worker thread monitored by heartbeaters 116 (at the time in which the workflow task is suspended) with the state output from work-item executor 140. Although the workflow tasks are paused, the lease TTL value of each corresponding token does not reset. As a result, a suspended workflow task may not finish executing within the time interval set by the lease TTL value (e.g., as the least TTL value expires). This may cause the execution of the workflow task to fail (e.g., server host 128 may not accept the execution result when execution of the workflow task resumes). If the workflow task fails, poller 108 may request the workflow task from server host 128 and the workflow task may start executing from the beginning.

Heartbeaters 116 may prevent the lease TTL value from expiring by renewing each token with server host 128. Heartbeater 116 may request a new token for each suspended workflow task. The renewed token includes a new lease TTL value (e.g., new time interval over which the workflow task is to execute). The new time interval may of a same length as the lease TTL value or may be equal to a specified task execution time (e.g., specified by an assignment TTL value).

Since the workflow tasks are suspended, the worker threads assigned to execute the workflow tasks may remain idle. The execution environment may execute other processes using the worker threads during the delay to prevent the worker threads (and the client device) from remaining idle. The execution environment may include processing queue 312. Upon receiving a delay operation that suspends execution of a workflow, work-item executor 140 may execute a process from processing queue 312 using the idle worker threads. Examples of processes include, but are not limited to, other workflow tasks (e.g., workflow tasks scheduled to execute after the current workflow, workflow tasks assigned to another execution environment or client device, or the like), local processes of the client device, diagnostic processes (e.g. processing, memory, and/or networking diagnostics, error/fault correction processes, processes assigned by server host 128, or the like).

When the delay terminates, work-item executor may retrieve the suspended workflow tasks from temporary workflow task queue 308 and the corresponding state information. Work-item executor 140 may then resume execution of each workflow task using the worker threads (e.g., workers 212-1-212-n) at the point of execution when execution was suspended. Work-item executor 140 may output updated state information to heartbeaters 116 (through box 120) to enable heartbeaters 116 may to continue to monitor the execution of the worker threads.

Figure 4:
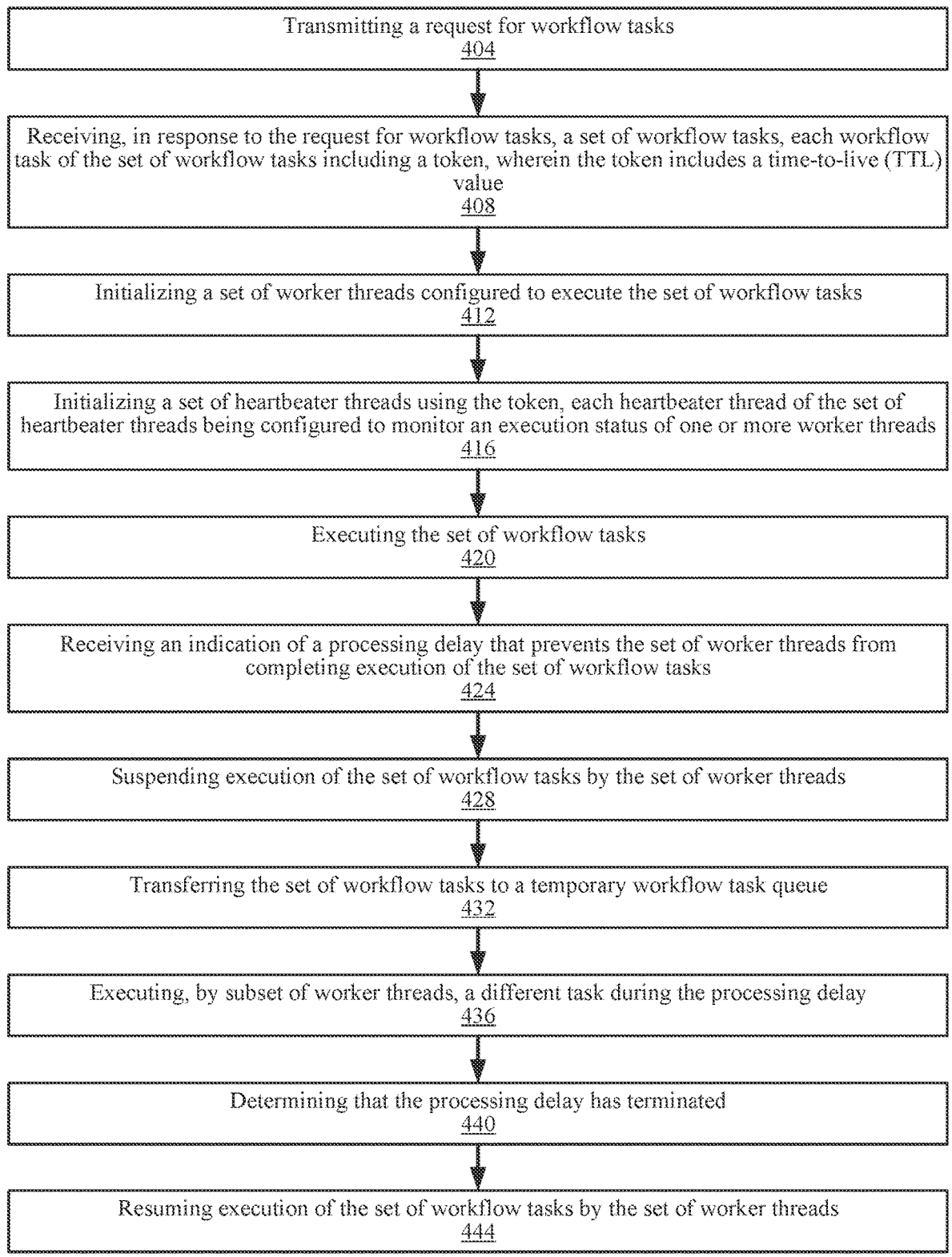
FIG. 4 depicts an example flowchart of a process for efficient worker utilization during client-side execution of distributed workflows, according to certain embodiments of the present disclosure.

FIG. 4 depicts an example flowchart of a process for efficient worker utilization during client-side execution of distributed workflows, according to certain embodiments of the present disclosure. At block 404, a client device requests a workflow task from a server for execution by the client device. The request may include an identification of the workflow that is requested. For instance, the request may include one or more period delineated operands (e.g., alphanumeric characters) such as, but not limited to, an identifier, type, major version, minor version, type, or the like. The server may identify the workflow that includes each operand. For instance, if the request includes Workflow.1.3, the server will return a workflow with an identifier of "Workflow", a major version of 1, and a minor version of 3.

In some instances, one or more operands can include a wildcard that enables the server to identify any workflow that includes the other operands. For instance, for Workflow.1.* (where '*' represents the wildcard), the server may return a workflow with an identifier of "Workflow", a major version of 1, and any minor version and or any step type. The wildcard may be included in place of an operand or in a position within the operand. When positioned with an operand the server may identify a workflow that matches the portion of the operand up to the wildcard and having any portion of the operand after the wildcard. For instance, for Workflow.*.*.*., the server may return "Workflow. 3.1." because the identifier matches the wildcards. The server may also return tasks for "Workflow.3.2". The wildcard enables the server to identify more workflows that may satisfy the constraints of the request, which may increase the likelihood that server is able to satisfy the request with a workflow.

At block 408, the client device may receive a set of workflow tasks from the server. The set of tasks correspond to the requested workflow. Each workflow task may include a token that indicates a time-to-live (TTL) value. The TTL value represents a time interval over which the workflow task is to execute. If the workflow task fails to execute before the time interval of the TTL value expires, the workflow task may be terminated. In some instances, when the time interval of the TTL value expires, the execution result of the workflow task may not be accepted. Instead the server the client device may request the workflow task from the server and execute the workflow task again.

At block 412, the client device may initialize a set of worker threads. In some instances, each worker thread may be configured to execute a workflow task of the set of workflow tasks (e.g., one-to-one). In other instances, two or more threads may be configured to execute a workflow task. In still yet other instances, one workflow task may be configured to execute on two or more workflow tasks.

At block 416, the client device may initialize a set of heartbeater threads using the token. Each heartbeater thread may be configured to monitor an execution status of one or more worker threads. In some instances, the set of heartbeater threads may be less than the set of worker threads. In those instances, at least one heartbeater thread monitors the execution of two or more worker threads. The heartbeater thread can use the token to ensure that execution of the workflow task by a worker thread does not exceed the time interval of the TTL value. For example, if a workflow task fails to execute within the time interval of the TTL value, the workflow task may have to be re-executed by the client device. To avoid wasteful processing of duplicate workflow tasks, the client device may utilize heartbeater threads to monitor worker threads and take remedial action if worker threads fail to execute correctly.

For example, if a worker thread fails to execute a workflow task within the time interval of the TTL value, the heartbeater may first determine if the worker thread is executing. If the worker thread is executing, then heartbeater may request to renew the token (e.g., reset the time interval of the TTL value). This gives the worker thread more time to execute the workflow task and prevents the client device from having to request the workflow task, receive the workflow task, and re-execute the workflow task from the beginning. If the worker thread has been executing beyond the time interval of the TTL value, the heartbeater thread may terminate the worker thread. The workflow task may be immediately reassigned to another worker thread so that the workflow task may execute within the time interval of the TTL.

At block 420, the client device executes the set of workflow tasks using the set of worker threads.

At block 424, an indication of a processing delay is received. The indication may be, for example, a notification, a software or processor interrupt, a communication from a remote device, or the like. For example, the processing delay may be triggered when the client device must execute another process such as a higher priority process, a process that requires the resources allocated to the execution of the set of workflow tasks, status check (e.g., to a downstream or upstream device), or the like. The processing delay may prevent the execution of the set of workflow tasks from completing.

At block 428, the client device, in response to receiving the indication of the processing delay, suspends execution of the set of workflow tasks by the set of worker threads. The client devices may determine the state of each workflow task so that execution of the workflow tasks can be resumed at the point of the workflow task in which execution was suspended. For example, the state may represent the last (or next) line of code to execute and/or the value of variables, data structures, memory registers, or the like. Capturing the state of each workflow task prevents the client device from having to re-execute some or all of a workflow task when execution of the set of workflow tasks resumes.

At block 432, the client device transfers the set of workflow tasks to a temporary workflow task queue. The temporary workflow task queue may store the set of workflow tasks and the corresponding state of each workflow task. In some instances, the temporary workflow task queue may be allocated in non-volatile memory to store workflow tasks for an indefinite time interval (e.g., while a processing delay is ongoing). In other instances, the client device may allocate memory for temporary workflow task queue upon receiving the indication of the processing delay while workflow tasks are execution. In those instances, the client device may allocate non-volatile or volatile memory for the temporary workflow task queue and deallocate the memory as soon as the execution of the set of workflow tasks resumes.

Since the workflow tasks are suspended and stored in the temporary workflow task queue, it is possible that the workflow tasks will complete execution within the time interval specified by the TTL value. The heartbeater threads may prevent the time interval of the TTL value from expiring by obtaining new tokens for each workflow thread. For example, the heartbeater threads may request to renew each token of each workflow task from the server as the time interval of the TTL value approaches expiration. Renewing the tokens may include resetting the time interval of the TTL value to get an extended validity of the token.

At block 436, the client device executes a set of different tasks using the set of worker threads. Since the processing delay caused execution of the workflow tasks to be suspended, the worker threads may remain idle until execution of the workflow tasks resumes. To avoid system idle time in which the client device, the client device may execute other tasks while waiting for the processing delay to terminate. The client device may include a task queue that includes processes that may be waiting for execution. In some instances, the tasks in the task queue may be low priority tasks (e.g., tasks that may not be scheduled to execute unless the client device is idle) such as diagnostic processes (e.g., processing diagnostics, network diagnostics, etc.), or the like. In other instances, the task queue may be filled with tasks associated with other non-workflow related applications, tasks associated with other workflows, tasks assigned from another device (e.g., such as server, other client devices, or the like).

At block 440, the client device determines that the processing delay has terminated. For instance, the client device may receive an indication that the process delay has terminated (e.g., a notification, processor of software interrupt, a communication, or the like). Alternatively, the client device may determine that the processing delay has terminated based on the indication of the processing delay received at block 424. For instance, when the client device receives the indication of the processing delay, the client device may also receive an indication of when the processing delay will terminate. The indication may specify a termination time, a termination time interval, and/or a termination event (e.g., a high priority task terminated, available processing resources is greater than a threshold, the status of a downstream or upstream device is received, or the like). For instance, the client device may determine that the processing delay has terminated when the current time is equal to the termination time.

At block 444, the client device resumes execution of the set of workflow tasks by the set of worker threads. For example, the client device may initialize execution of the set of workflow tasks stored in the temporary workflow task queue. The client device may then use the state information of each workflow task to resume execution the workflow task at the point of execution when the workflow task was suspended. For example, the state information may indicate the last line of code of the workflow task that executed. The worker thread may then resume executing the workflow task at the next line of code of the workflow task.

The client device stores the result of the execution of each workflow task when the worker threads complete. The client device may aggregate the results of each workflow task to generate a workflow result (e.g., the result of the workflow requested by the client device.

Alternatively, the client device may transmit the result of the execution of each workflow task as the workflow tasks finish executing.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 5:
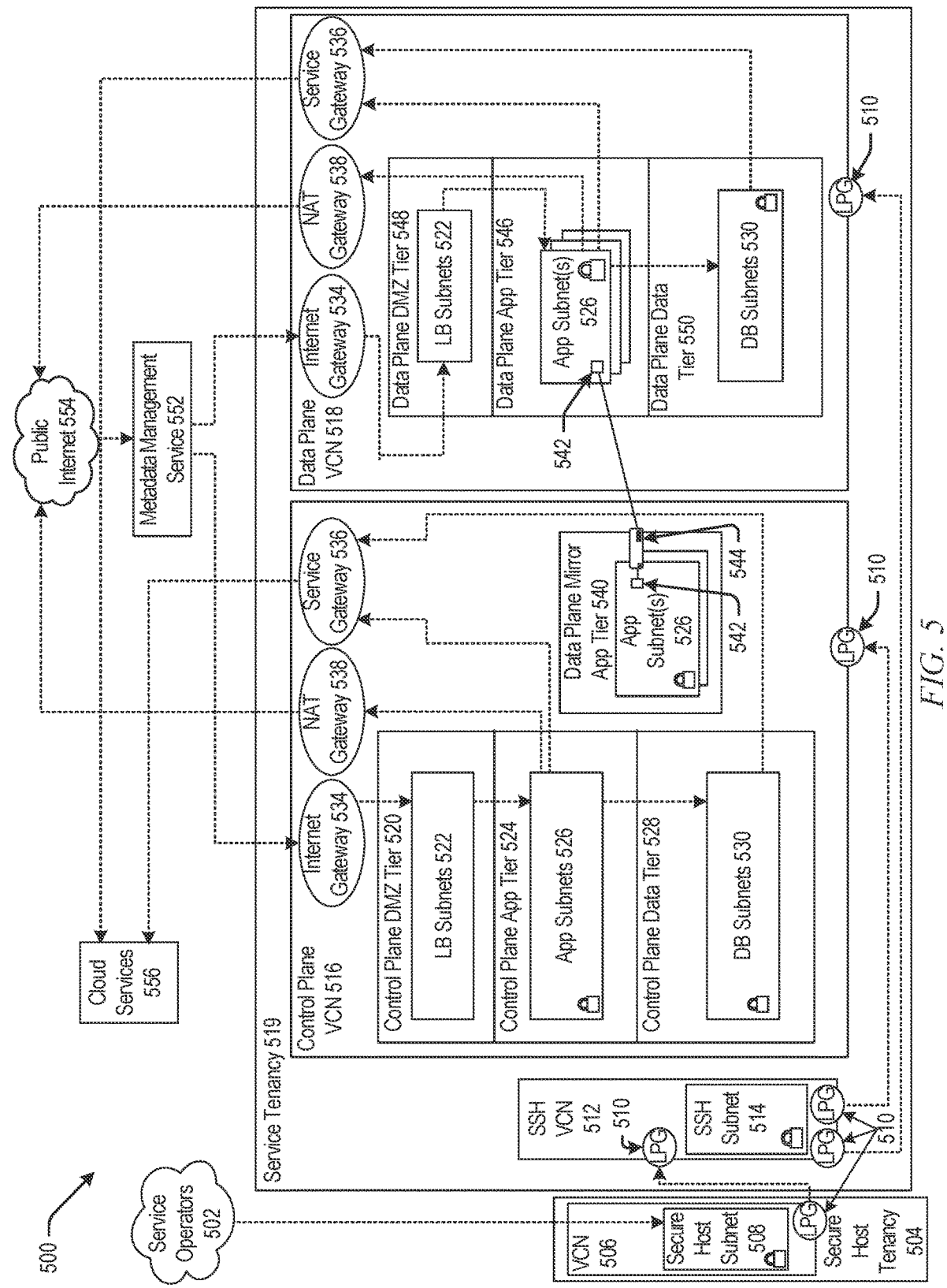
FIG. 5 is a block diagram illustrating one pattern for implementing a cloud infrastructure as a service system, according to at least one embodiment.

FIG. 5 is a block diagram 500 illustrating an example pattern of an IaaS architecture, according to at least one embodiment. Service operators 502 can be communicatively coupled to a secure host tenancy 504 that can include a virtual cloud network (VCN) 506 and a secure host subnet 508. In some examples, the service operators 502 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 506 and/or the Internet.

The VCN 506 can include a local peering gateway (LPG) 510 that can be communicatively coupled to a secure shell (SSH) VCN 512 via an LPG 510 contained in the SSH VCN 512. The SSH VCN 512 can include an SSH subnet 514, and the SSH VCN 512 can be communicatively coupled to a control plane VCN 516 via the LPG 510 contained in the control plane VCN 516. Also, the SSH VCN 512 can be communicatively coupled to a data plane VCN 518 via an LPG 510. The control plane VCN 516 and the data plane VCN 518 can be contained in a service tenancy 519 that can be owned and/or operated by the IaaS provider.

The control plane VCN 516 can include a control plane demilitarized zone (DMZ) tier 520 that acts as a perimeter network (e.g., portions of a corporate network between the corporate intranet and external networks). The DMZ-based servers may have restricted responsibilities and help keep security breaches contained. Additionally, the DMZ tier 520 can include one or more load balancer (LB) subnet(s) 522, a control plane app tier 524 that can include app subnet(s) 526, a control plane data tier 528 that can include database (DB) subnet(s) 530 (e.g., frontend DB subnet(s) and/or backend DB subnet(s)). The LB subnet(s) 522 contained in the control plane DMZ tier 520 can be communicatively coupled to the app subnet(s) 526 contained in the control plane app tier 524 and an Internet gateway 534 that can be contained in the control plane VCN 516, and the app subnet(s) 526 can be communicatively coupled to the DB subnet(s) 530 contained in the control plane data tier 528 and a service gateway 536 and a network address translation (NAT) gateway 538. The control plane VCN 516 can include the service gateway 536 and the NAT gateway 538.

The control plane VCN 516 can include a data plane mirror app tier 540 that can include app subnet(s) 526. The app subnet(s) 526 contained in the data plane mirror app tier 540 can include a virtual network interface controller (VNIC) 542 that can execute a compute instance 544. The compute instance 544 can communicatively couple the app subnet(s) 526 of the data plane mirror app tier 540 to app subnet(s) 526 that can be contained in a data plane app tier 546.

The data plane VCN 518 can include the data plane app tier 546, a data plane DMZ tier 548, and a data plane data tier 550. The data plane DMZ tier 548 can include LB subnet(s) 522 that can be communicatively coupled to the app subnet(s) 526 of the data plane app tier 546 and the Internet gateway 534 of the data plane VCN 518. The app subnet(s) 526 can be communicatively coupled to the service gateway 536 of the data plane VCN 518 and the NAT gateway 538 of the data plane VCN 518. The data plane data tier 550 can also include the DB subnet(s) 530 that can be communicatively coupled to the app subnet(s) 526 of the data plane app tier 546.

The Internet gateway 534 of the control plane VCN 516 and of the data plane VCN 518 can be communicatively coupled to a metadata management service 552 that can be communicatively coupled to public Internet 554. Public Internet 554 can be communicatively coupled to the NAT gateway 538 of the control plane VCN 516 and of the data plane VCN 518. The service gateway 536 of the control plane VCN 516 and of the data plane VCN 518 can be communicatively couple to cloud services 556.

In some examples, the service gateway 536 of the control plane VCN 516 or of the data plane VCN 518 can make application programming interface (API) calls to cloud services 556 without going through public Internet 554. The API calls to cloud services 556 from the service gateway 536 can be one-way: the service gateway 536 can make API calls to cloud services 556, and cloud services 556 can send requested data to the service gateway 536. But, cloud services 556 may not initiate API calls to the service gateway 536.

In some examples, the secure host tenancy 504 can be directly connected to the service tenancy 519, which may be otherwise isolated. The secure host subnet 508 can communicate with the SSH subnet 514 through an LPG 510 that may enable two-way communication over an otherwise isolated system. Connecting the secure host subnet 508 to the SSH subnet 514 may give the secure host subnet 508 access to other entities within the service tenancy 519.

The control plane VCN 516 may allow users of the service tenancy 519 to set up or otherwise provision desired resources. Desired resources provisioned in the control plane VCN 516 may be deployed or otherwise used in the data plane VCN 518. In some examples, the control plane VCN 516 can be isolated from the data plane VCN 518, and the data plane mirror app tier 540 of the control plane VCN 516 can communicate with the data plane app tier 546 of the data plane VCN 518 via VNICs 542 that can be contained in the data plane mirror app tier 540 and the data plane app tier 546.

In some examples, users of the system, or customers, can make requests, for example create, read, update, or delete (CRUD) operations, through public Internet 554 that can communicate the requests to the metadata management service 552. The metadata management service 552 can communicate the request to the control plane VCN 516 through the Internet gateway 534. The request can be received by the LB subnet(s) 522 contained in the control plane DMZ tier 520. The LB subnet(s) 522 may determine that the request is valid, and in response to this determination, the LB subnet(s) 522 can transmit the request to app subnet(s) 526 contained in the control plane app tier 524. If the request is validated and requires a call to public Internet 554, the call to public Internet 554 may be transmitted to the NAT gateway 538 that can make the call to public Internet 554. Memory that may be desired to be stored by the request can be stored in the DB subnet(s) 530.

In some examples, the data plane mirror app tier 540 can facilitate direct communication between the control plane VCN 516 and the data plane VCN 518. For example, changes, updates, or other suitable modifications to configuration may be desired to be applied to the resources contained in the data plane VCN 518. Via a VNIC 542, the control plane VCN 516 can directly communicate with, and can thereby execute the changes, updates, or other suitable modifications to configuration to, resources contained in the data plane VCN 518.

In some embodiments, the control plane VCN 516 and the data plane VCN 518 can be contained in the service tenancy 519. In this case, the user, or the customer, of the system may not own or operate either the control plane VCN 516 or the data plane VCN 518. Instead, the IaaS provider may own or operate the control plane VCN 516 and the data plane VCN 518, both of which may be contained in the service tenancy 519. This embodiment can enable isolation of networks that may prevent users or customers from interacting with other users', or other customers', resources. Also, this embodiment may allow users or customers of the system to store databases privately without needing to rely on public Internet 554, which may not have a desired level of security, for storage.

In other embodiments, the LB subnet(s) 522 contained in the control plane VCN 516 can be configured to receive a signal from the service gateway 536. In this embodiment, the control plane VCN 516 and the data plane VCN 518 may be configured to be called by a customer of the IaaS provider without calling public Internet 554. Customers of the IaaS provider may desire this embodiment since database(s) that the customers use may be controlled by the IaaS provider and may be stored on the service tenancy 519, which may be isolated from public Internet 554.

Figure 6:
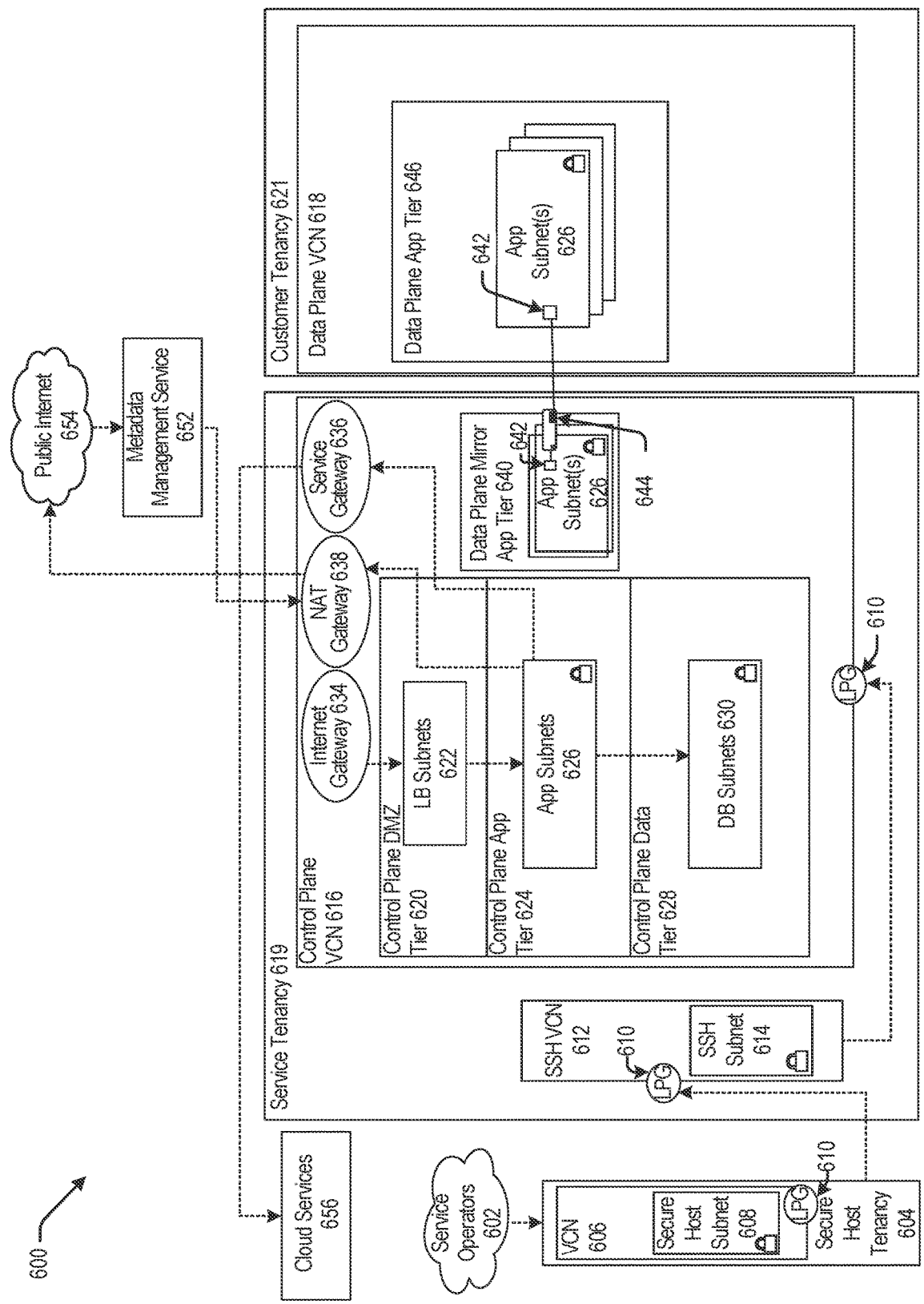
FIG. 6 is a block diagram illustrating another pattern for implementing a cloud infrastructure as a service system, according to at least one embodiment.

FIG. 6 is a block diagram 600 illustrating another example pattern of an IaaS architecture, according to at least one embodiment. Service operators 602 (e.g. service operators 502 of FIG. 5) can be communicatively coupled to a secure host tenancy 604 (e.g. the secure host tenancy 504 of FIG. 5) that can include a virtual cloud network (VCN) 606 (e.g. the VCN 506 of FIG. 5) and a secure host subnet 608 (e.g. the secure host subnet 508 of FIG. 5). The VCN 606 can include a local peering gateway (LPG) 610 (e.g. the LPG 510 of FIG. 5) that can be communicatively coupled to a secure shell (SSH) VCN 612 (e.g. the SSH VCN 512 of FIG. 5) via an LPG 510 contained in the SSH VCN 612. The SSH VCN 612 can include an SSH subnet 614 (e.g. the SSH subnet 514 of FIG. 5), and the SSH VCN 612 can be communicatively coupled to a control plane VCN 616 (e.g. the control plane VCN 516 of FIG. 5) via an LPG 610 contained in the control plane VCN 616. The control plane VCN 616 can be contained in a service tenancy 619 (e.g. the service tenancy 519 of FIG. 5), and the data plane VCN 618 (e.g. the data plane VCN 518 of FIG. 5) can be contained in a customer tenancy 621 that may be owned or operated by users, or customers, of the system.

The control plane VCN 616 can include a control plane DMZ tier 620 (e.g. the control plane DMZ tier 520 of FIG. 5) that can include LB subnet(s) 622 (e.g. LB subnet(s) 522 of FIG. 5), a control plane app tier 624 (e.g. the control plane app tier 524 of FIG. 5) that can include app subnet(s) 626 (e.g. app subnet(s) 526 of FIG. 5), a control plane data tier 628 (e.g. the control plane data tier 528 of FIG. 5) that can include database (DB) subnet(s) 630 (e.g. similar to DB subnet(s) 530 of FIG. 5). The LB subnet(s) 622 contained in the control plane DMZ tier 620 can be communicatively coupled to the app subnet(s) 626 contained in the control plane app tier 624 and an Internet gateway 634 (e.g. the Internet gateway 534 of FIG. 5) that can be contained in the control plane VCN 616, and the app subnet(s) 626 can be communicatively coupled to the DB subnet(s) 630 contained in the control plane data tier 628 and a service gateway 636 (e.g. the service gateway of FIG. 5) and a network address translation (NAT) gateway 638 (e.g. the NAT gateway 538 of FIG. 5). The control plane VCN 616 can include the service gateway 636 and the
NAT gateway 638.

The control plane VCN 616 can include a data plane mirror app tier 640 (e.g. the data plane mirror app tier 540 of FIG. 5) that can include app subnet(s) 626. The app subnet(s) 626 contained in the data plane mirror app tier 640 can include a virtual network interface controller (VNIC) 642 (e.g. the VNIC of 542) that can execute a compute instance 644 (e.g. similar to the compute instance 544 of FIG. 5). The compute instance 644 can facilitate communication between the app subnet(s) 626 of the data plane mirror app tier 640 and the app subnet(s) 626 that can be contained in a data plane app tier 646 (e.g. the data plane app tier 546 of FIG. 5) via the VNIC 642 contained in the data plane mirror app tier 640 and the VNIC 642 contained in the data plane app tier 646.

The Internet gateway 634 contained in the control plane VCN 616 can be communicatively coupled to a metadata management service 652 (e.g. the metadata management service 552 of FIG. 5) that can be communicatively coupled to public Internet 654 (e.g. public Internet 554 of FIG. 5). Public Internet 654 can be communicatively coupled to the NAT gateway 638 contained in the control plane VCN 616. The service gateway 636 contained in the control plane VCN 616 can be communicatively couple to cloud services 656 (e.g. cloud services 556 of FIG. 5).

In some examples, the data plane VCN 618 can be contained in the customer tenancy 621. In this case, the IaaS provider may provide the control plane VCN 616 for each customer, and the IaaS provider may, for each customer, set up a unique compute instance 644 that is contained in the service tenancy 619. Each compute instance 644 may allow communication between the control plane VCN 616, contained in the service tenancy 619, and the data plane VCN 618 that is contained in the customer tenancy 621. The compute instance 644 may allow resources, that are provisioned in the control plane VCN 616 that is contained in the service tenancy 619, to be deployed or otherwise used in the data plane VCN 618 that is contained in the customer tenancy 621.

In other examples, the customer of the IaaS provider may have databases that live in the customer tenancy 621. In this example, the control plane VCN 616 can include the data plane mirror app tier 640 that can include app subnet(s) 626. The data plane mirror app tier 640 can reside in the data plane VCN 618, but the data plane mirror app tier 640 may not live in the data plane VCN 618. That is, the data plane mirror app tier 640 may have access to the customer tenancy 621, but the data plane mirror app tier 640 may not exist in the data plane VCN 618 or be owned or operated by the customer of the IaaS provider. The data plane mirror app tier 640 may be configured to make calls to the data plane VCN 618 but may not be configured to make calls to any entity contained in the control plane VCN 616. The customer may desire to deploy or otherwise use resources in the data plane VCN 618 that are provisioned in the control plane VCN 616, and the data plane mirror app tier 640 can facilitate the desired deployment, or other usage of resources, of the customer.

In some embodiments, the customer of the IaaS provider can apply filters to the data plane VCN 618. In this embodiment, the customer can determine what the data plane VCN 618 can access, and the customer may restrict access to public Internet 654 from the data plane VCN 618. The IaaS provider may not be able to apply filters or otherwise control access of the data plane VCN 618 to any outside networks or databases. Applying filters and controls by the customer onto the data plane VCN 618, contained in the customer tenancy 621, can help isolate the data plane VCN 618 from other customers and from public Internet 654.

In some embodiments, cloud services 656 can be called by the service gateway 636 to access services that may not exist on public Internet 654, on the control plane VCN 616, or on the data plane VCN 618. The connection between cloud services 656 and the control plane VCN 616 or the data plane VCN 618 may not be live or continuous. Cloud services 656 may exist on a different network owned or operated by the IaaS provider. Cloud services 656 may be configured to receive calls from the service gateway 636 and may be configured to not receive calls from public Internet 654. Some cloud services 656 may be isolated from other cloud services 656, and the control plane VCN 616 may be isolated from cloud services 656 that may not be in the same region as the control plane VCN 616. For example, the control plane VCN 616 may be located in "Region 1," and cloud service "Deployment 5," may be located in Region 1 and in "Region 2." If a call to Deployment 5 is made by the service gateway 636 contained in the control plane VCN 616 located in Region 1, the call may be transmitted to Deployment 5 in Region 1. In this example, the control plane VCN 616, or Deployment 5 in Region 1, may not be communicatively coupled to, or otherwise in communication with, Deployment 5 in Region 2.

Figure 7:
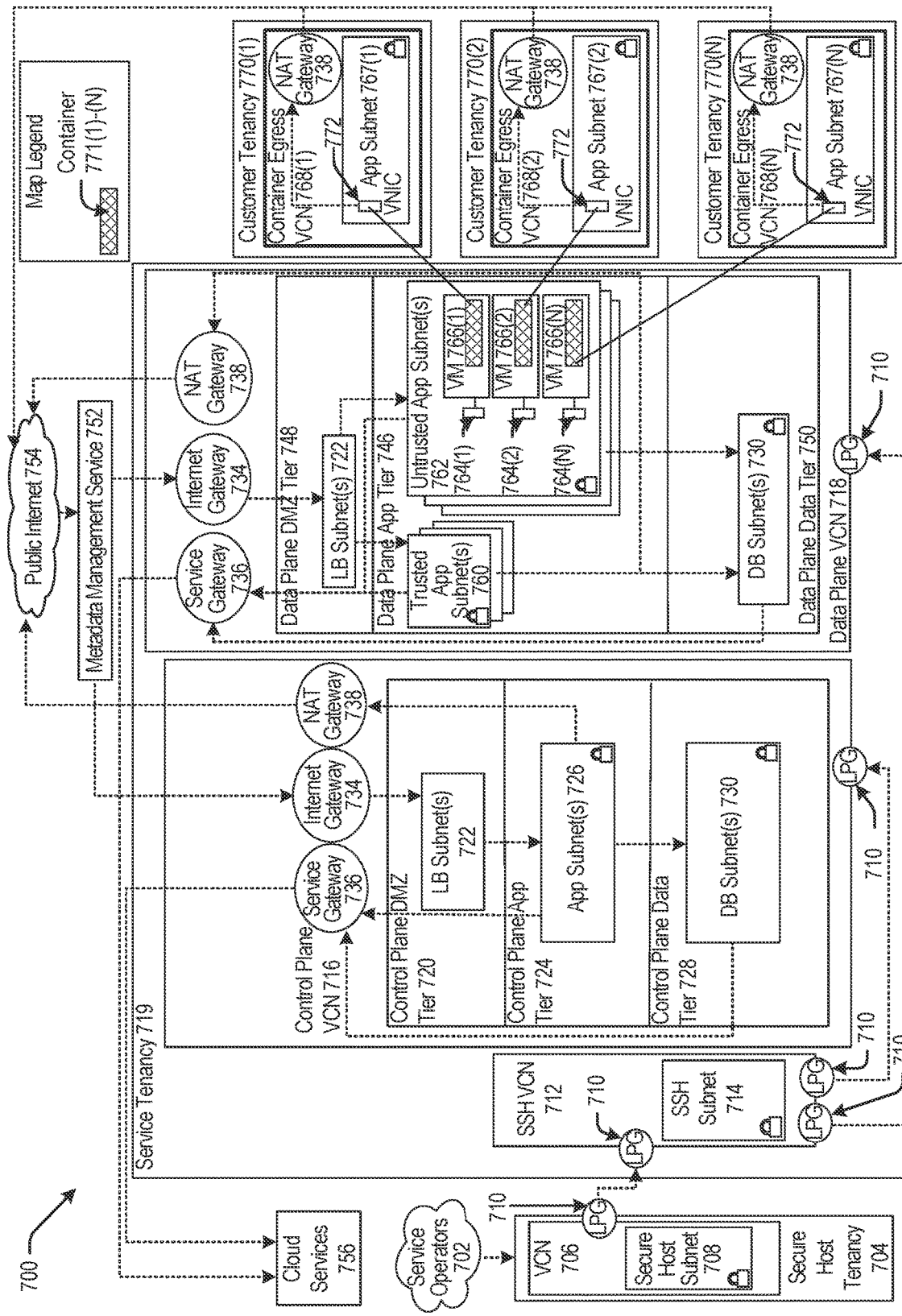
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 502 of FIG. 5) can be communicatively coupled to a secure host tenancy 704 (e.g. the secure host tenancy 504 of FIG. 5) that can include a virtual cloud network (VCN) 706 (e.g. the VCN 506 of FIG. 5) and a secure host subnet 708 (e.g. the secure host subnet 508 of FIG. 5). The VCN 706 can include an LPG 710 (e.g. the LPG 510 of FIG. 5) that can be communicatively coupled to an SSH VCN 712 (e.g. the SSH VCN 512 of FIG. 5) via an LPG 710 contained in the SSH VCN 712. The SSH VCN 712 can include an SSH subnet 714 (e.g. the SSH subnet 514 of FIG. 5), and the SSH VCN 712 can be communicatively coupled to a control plane VCN 716 (e.g. the control plane VCN 516 of FIG. 5) via an LPG 710 contained in the control plane VCN 716 and to a data plane VCN 718 (e.g. the data plane 518 of FIG. 5) via an LPG 710 contained in the data plane VCN 718. The control plane VCN 716 and the data plane VCN 718 can be contained in a service tenancy 719 (e.g. the service tenancy 519 of FIG. 5).

The control plane VCN 716 can include a control plane DMZ tier 720 (e.g. the control plane DMZ tier 520 of FIG. 5) that can include load balancer (LB) subnet(s) 722 (e.g. LB subnet(s) 522 of FIG. 5), a control plane app tier 724 (e.g. the control plane app tier 524 of FIG. 5) that can include app subnet(s) 726 (e.g. similar to app subnet(s) 526 of FIG. 5), a control plane data tier 728 (e.g. the control plane data tier 528 of FIG. 5) that can include DB subnet(s) 730. The LB subnet(s) 722 contained in the control plane DMZ tier 720 can be communicatively coupled to the app subnet(s) 726 contained in the control plane app tier 724 and to an Internet gateway 734 (e.g. the Internet gateway 534 of FIG. 5) that can be contained in the control plane VCN 716, and the app subnet(s) 726 can be communicatively coupled to the DB subnet(s) 730 contained in the control plane data tier 728 and to a service gateway 736 (e.g. the service gateway of FIG. 5) and a network address translation (NAT) gateway 738 (e.g. the NAT gateway 538 of FIG. 5). The control plane VCN 716 can include the service gateway 736 and the NAT gateway 738.

The data plane VCN 718 can include a data plane app tier 746 (e.g. the data plane app tier 546 of FIG. 5), a data plane DMZ tier 748 (e.g. the data plane DMZ tier 548 of FIG. 5), and a data plane data tier 750 (e.g. the data plane data tier 550 of FIG. 5). The data plane DMZ tier 748 can include LB subnet(s) 722 that can be communicatively coupled to trusted app subnet(s) 760 and untrusted app subnet(s) 762 of the data plane app tier 746 and the Internet gateway 734 contained in the data plane VCN 718. The trusted app subnet(s) 760 can be communicatively coupled to the service gateway 736 contained in the data plane VCN 718, the NAT gateway 738 contained in the data plane VCN 718, and DB subnet(s) 730 contained in the data plane data tier 750. The untrusted app subnet(s) 762 can be communicatively coupled to the service gateway 736 contained in the data plane VCN 718 and DB subnet(s) 730 contained in the data plane data tier 750. The data plane data tier 750 can include DB subnet(s) 730 that can be communicatively coupled to the service gateway 736 contained in the data plane VCN 718.

The untrusted app subnet(s) 762 can include one or more primary VNICs 764(1)-(N) that can be communicatively coupled to tenant virtual machines (VMs) 766(1)-(N). Each tenant VM 766(1)-(N) can be communicatively coupled to a respective app subnet 767(1)-(N) that can be contained in respective container egress VCNs 768(1)-(N) that can be contained in respective customer tenancies 770(1)-(N). Respective secondary VNICs 772(1)-(N) can facilitate communication between the untrusted app subnet(s) 762 contained in the data plane VCN 718 and the app subnet contained in the container egress VCNs 768(1)-(N). Each container egress VCNs 768(1)-(N) can include a NAT gateway 738 that can be communicatively coupled to public Internet 754 (e.g. public Internet 554 of FIG. 5).

The Internet gateway 734 contained in the control plane VCN 716 and contained in the data plane VCN 718 can be communicatively coupled to a metadata management service 752 (e.g. the metadata management system 552 of FIG. 5) that can be communicatively coupled to public Internet 754. Public Internet 754 can be communicatively coupled to the NAT gateway 738 contained in the control plane VCN 716 and contained in the data plane VCN 718. The service gateway 736 contained in the control plane VCN 716 and contained in the data plane VCN 718 can be communicatively couple to cloud services 756.

In some embodiments, the data plane VCN 718 can be integrated with customer tenancies 770. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 746. Code to run the function may be executed in the VMs 766(1)-(N), and the code may not be configured to run anywhere else on the data plane VCN 718. Each VM 766(1)-(N) may be connected to one customer tenancy 770. Respective containers 771(1)-(N) contained in the VMs 766(1)-(N) may be configured to run the code. In this case, there can be a dual isolation (e.g., the containers 771(1)-(N) running code, where the containers 771(1)-(N) may be contained in at least the VM 766(1)-(N) that are contained in the untrusted app subnet(s) 762), which may help prevent incorrect or otherwise undesirable code from damaging the network of the IaaS provider or from damaging a network of a different customer. The containers 771(1)-(N) may be communicatively coupled to the customer tenancy 770 and may be configured to transmit or receive data from the customer tenancy 770. The containers 771(1)-(N) may not be configured to transmit or receive data from any other entity in the data plane VCN 718. Upon completion of running the code, the IaaS provider may kill or otherwise dispose of the containers 771(1)-(N).

In some embodiments, the trusted app subnet(s) 760 may run code that may be owned or operated by the IaaS provider. In this embodiment, the trusted app subnet(s) 760 may be communicatively coupled to the DB subnet(s) 730 and be configured to execute CRUD operations in the DB subnet(s) 730. The untrusted app subnet(s) 762 may be communicatively coupled to the DB subnet(s) 730, but in this embodiment, the untrusted app subnet(s) may be configured to execute read operations in the DB subnet(s) 730. The containers 771(1)-(N) that can be contained in the VM 766(1)-(N) of each customer and that may run code from the customer may not be communicatively coupled with the DB subnet(s) 730.

In other embodiments, the control plane VCN 716 and the data plane VCN 718 may not be directly communicatively coupled. In this embodiment, there may be no direct communication between the control plane VCN 716 and the data plane VCN 718. However, communication can occur indirectly through at least one method. An LPG 710 may be established by the IaaS provider that can facilitate communication between the control plane VCN 716 and the data plane VCN 718. In another example, the control plane VCN 716 or the data plane VCN 718 can make a call to cloud services 756 via the service gateway 736. For example, a call to cloud services 756 from the control plane VCN 716 can include a request for a service that can communicate with the data plane VCN 718.

Figure 8:
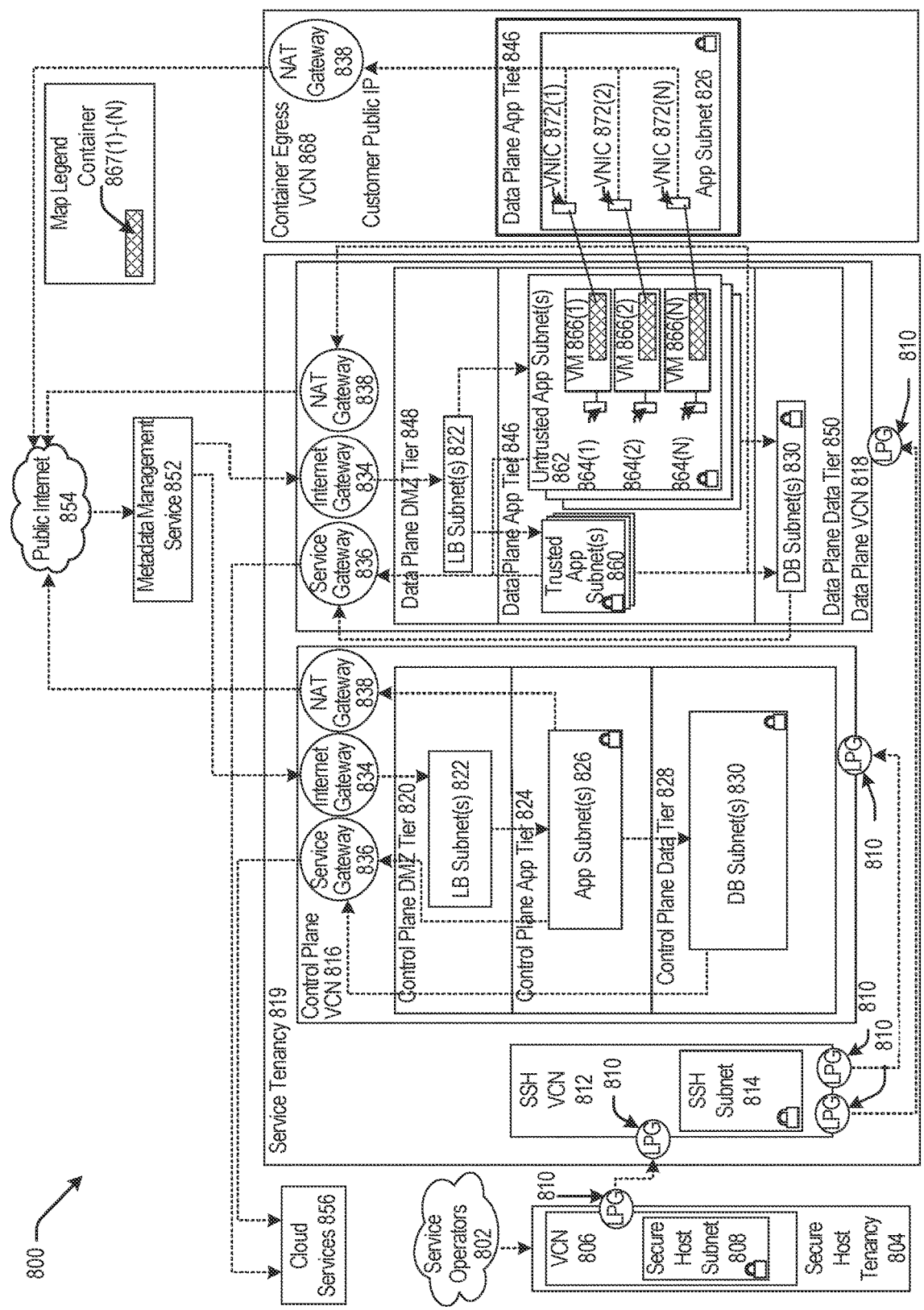
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 502 of FIG. 5) can be communicatively coupled to a secure host tenancy 804 (e.g. the secure host tenancy 504 of FIG. 5) that can include a virtual cloud network (VCN) 806 (e.g. the VCN 506 of FIG. 5) and a secure host subnet 808 (e.g. the secure host subnet 508 of FIG. 5). The VCN 806 can include an LPG 810 (e.g. the LPG 510 of FIG. 5) that can be communicatively coupled to an SSH VCN 812 (e.g. the SSH VCN 512 of FIG. 5) via an LPG 810 contained in the SSH VCN 812. The SSH VCN 812 can include an SSH subnet 814 (e.g. the SSH subnet 514 of FIG. 5), and the SSH VCN 812 can be communicatively coupled to a control plane VCN 816 (e.g. the control plane VCN 516 of FIG. 5) via an LPG 810 contained in the control plane VCN 816 and to a data plane VCN 818 (e.g. the data plane 518 of FIG. 5) via an LPG 810 contained in the data plane VCN 818. The control plane VCN 816 and the data plane VCN 818 can be contained in a service tenancy 819 (e.g. the service tenancy 519 of FIG. 5).

The control plane VCN 816 can include a control plane DMZ tier 820 (e.g. the control plane DMZ tier 520 of FIG. 5) that can include LB subnet(s) 822 (e.g. LB subnet(s) 522 of FIG. 5), a control plane app tier 824 (e.g. the control plane app tier 524 of FIG. 5) that can include app subnet(s) 826 (e.g. app subnet(s) 526 of FIG. 5), a control plane data tier 828 (e.g. the control plane data tier 528 of FIG. 5) that can include DB subnet(s) 830 (e.g. DB subnet(s) 730 of FIG. 7). The LB subnet(s) 822 contained in the control plane DMZ tier 820 can be communicatively coupled to the app subnet(s) 826 contained in the control plane app tier 824 and to an Internet gateway 834 (e.g. the Internet gateway 534 of FIG. 5) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 5) and a network address translation (NAT) gateway 838 (e.g. the NAT gateway 538 of FIG. 5). The control plane VCN 816 can include the service gateway 836 and the NAT gateway 838.

The data plane VCN 818 can include a data plane app tier 846 (e.g. the data plane app tier 546 of FIG. 5), a data plane DMZ tier 848 (e.g. the data plane DMZ tier 548 of FIG. 5), and a data plane data tier 850 (e.g. the data plane data tier 550 of FIG. 5). The data plane DMZ tier 848 can include LB subnet(s) 822 that can be communicatively coupled to trusted app subnet(s) 860 (e.g. trusted app subnet(s) 760 of FIG. 7) and untrusted app subnet(s) 862 (e.g. untrusted app subnet(s) 762 of FIG. 7) of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include primary VNICs 864(1)-(N) that can be communicatively coupled to tenant virtual machines (VMs) 866(1)-(N) residing within the untrusted app subnet(s) 862. Each tenant VM 866(1)-(N) can run code in a respective container 867(1)-(N), and be communicatively coupled to an app subnet 826 that can be contained in a data plane app tier 846 that can be contained in a container egress VCN 868. Respective secondary VNICs 872(1)-(N) can facilitate communication between the untrusted app subnet(s) 862 contained in the data plane VCN 818 and the app subnet contained in the container egress VCN 868. The container egress VCN can include a NAT gateway 838 that can be communicatively coupled to public Internet 854 (e.g. public Internet 554 of FIG. 5).

The Internet gateway 834 contained in the control plane VCN 816 and contained in the data plane VCN 818 can be communicatively coupled to a metadata management service 852 (e.g. the metadata management system 552 of FIG. 5) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some examples, the pattern illustrated by the architecture of block diagram 800 of FIG. 8 may be considered an exception to the pattern illustrated by the architecture of block diagram 700 of FIG. 7 and may be desirable for a customer of the IaaS provider if the IaaS provider cannot directly communicate with the customer (e.g., a disconnected region). The respective containers 867(1)-(N) that are contained in the VMs 866(1)-(N) for each customer can be accessed in real-time by the customer. The containers 867(1)-(N) may be configured to make calls to respective secondary VNICs 872(1)-(N) contained in app subnet(s) 826 of the data plane app tier 846 that can be contained in the container egress VCN 868. The secondary VNICs 872(1)-(N) can transmit the calls to the NAT gateway 838 that may transmit the calls to public Internet 854. In this example, the containers 867(1)-(N) that can be accessed in real-time by the customer can be isolated from the control plane VCN 816 and can be isolated from other entities contained in the data plane VCN 818. The containers 867(1)-(N) may also be isolated from resources from other customers.

In other examples, the customer can use the containers 867(1)-(N) to call cloud services 856. In this example, the customer may run code in the containers 867(1)-(N) that requests a service from cloud services 856. The containers 867(1)-(N) can transmit this request to the secondary VNICs 872(1)-(N) that can transmit the request to the NAT gateway that can transmit the request to public Internet 854. Public Internet 854 can transmit the request to LB subnet(s) 822 contained in the control plane VCN 816 via the Internet gateway 834. In response to determining the request is valid, the LB subnet(s) can transmit the request to app subnet(s) 826 that can transmit the request to cloud services 856 via the service gateway 836.

It should be appreciated that IaaS architectures 500, 600, 700, 800 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 9:
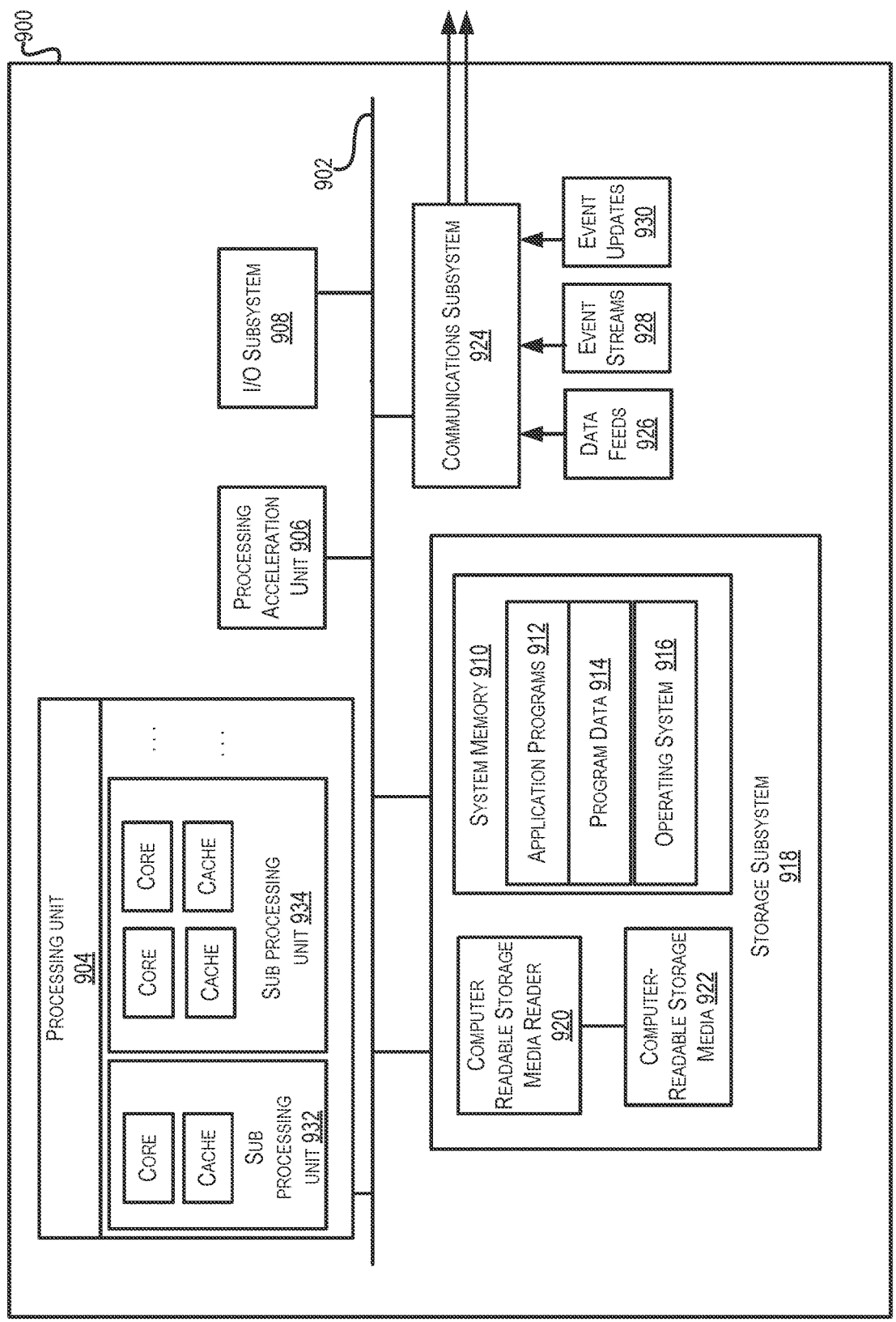
FIG. 9 is a block diagram illustrating an example computer system, according to at least one embodiment.

FIG. 9 illustrates an example computer system 900, in which various embodiments may be implemented such as the client device described in connection with FIGS. 1-4. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 9 OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with the present disclosure.

Storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   transmitting, from a first thread executing on a client device, a request for workflow tasks to a server;
   receiving, in response to the request for workflow tasks, a set of workflow tasks, each workflow task of the set of workflow tasks including a token;
   initializing a set of worker threads, each worker thread of the set of worker threads being configured to execute a workflow task of the set of workflow tasks;
   initializing, using the token of each workflow task, a set of second threads, each second thread of the set of second threads being configured to monitor an execution status of one or more worker threads of the set of worker threads; and
   executing, by the set of worker threads, the set of workflow tasks.

2. The method of claim 1, further comprising:
   receiving an indication of a processing delay that prevents the set of worker threads from completing execution of the set of workflow tasks;
   suspending execution of the set of workflow tasks by the set of worker threads;
   adding the set of workflow tasks to a temporary workflow task queue;
   executing, by a subset of the set of worker threads, a different task during the processing delay;
   determining that the processing delay has terminated; and
   resuming, in response to determining that the processing delay has terminated, execution of the set of workflow tasks by the set of worker threads.

3. The method of claim 2, wherein the token includes a time-to-live (TTL) value.

4. The method of claim 3, wherein the set of second threads is smaller than the set of worker threads.

5. The method of claim 4, further comprising:
   identifying a time interval between a current time and a time when a particular workflow task of the set of workflow tasks was received;
   determining, by a particular second thread of the set of second threads, that the time interval is greater than or equal to the TTL value;
   detecting, by the particular second thread, that the processing delay is occurring; and
   resetting, by the particular second thread, the time interval, wherein resetting the time interval causes the particular workflow task to be retained at the client device.

6. The method of claim 3, wherein the TTL value corresponds to a time interval over which a workflow task is to be completed.

7. The method of claim 1, further comprising:
   receiving, from each worker thread of the set of worker threads, a workflow task result and the token; and
   authenticating the workflow task result using the token.

8. The method of claim 1, wherein the processing delay is caused by a status checking process that determines a status of a downstream device.

9. The method of claim 1, wherein the set of workflow tasks includes a quantity of workflow tasks that is based on a snapshot of worker thread availability.

10. A client device, comprising:
    one or more processors; and
    a non-transitory computer-readable medium comprising instructions that, when executed by the one or more processors, cause the one or more processors to at least:
    transmit, from a first thread executing on the client device, a request for workflow tasks to a server;
    receive, in response to the request for workflow tasks, a set of workflow tasks, each workflow task of the set of workflow tasks including a token;

initialize a set of worker threads, each worker thread of the set of worker threads being configured to execute a workflow task of the set of workflow tasks;

initialize, using the token of each workflow task, a set of second threads, each second thread of the set of second threads being configured to monitor an execution status of one or more worker threads of the set of worker threads; and execute, by the set of worker threads, the set of workflow tasks.

11. The client device of claim 10, wherein the set of second threads is smaller than the set of worker threads.

12. The client device of claim 11, wherein the operations further include:

identifying a time interval between a current time and a time when a particular workflow task of the set of workflow tasks was received;

determining, by a particular second thread of the set of second threads, that the time interval is greater than or equal to a time-to-live (TTL) value;

detecting, by the particular second thread, that the processing delay is occurring; and resetting, by the particular second thread, the time interval, wherein resetting the time interval causes the particular workflow task to be retained at the client device.

13. The client device of claim 12, wherein the TTL value corresponds to a time interval over which a workflow task is to be completed.

14. The client device of claim 10, wherein the operations further include:

receiving, from each worker thread of the set of worker threads, a workflow task result and the token;

authenticating the workflow task result using the token.

15. The client device of claim 10, wherein the processing delay is caused by a status checking process that determines a status of a downstream device.

16. The client device of claim 10, wherein the set of workflow tasks includes a quantity of workflow tasks that is based on a snapshot of worker thread availability.

17. A non-transitory computer-readable medium comprising instructions that, when executed by one or more processors of a client device, cause the one or more processors to perform operations comprising:

transmitting, from a first thread executing on the client device, a request for workflow tasks to a server;

receiving, in response to the request for workflow tasks, a set of workflow tasks, each workflow task of the set of workflow tasks including a token;

initializing a set of worker threads, each worker thread of the set of worker threads being configured to execute a workflow task of the set of workflow tasks;

initializing, using the token of each workflow task, a set of second threads, each second thread of the set of second threads being configured to monitor an execution status of one or more worker threads of the set of worker threads; and executing, by the set of worker threads, the set of workflow tasks.

18. The non-transitory computer-readable medium of claim 17, wherein the set of second threads is smaller than the set of worker threads.

19. The non-transitory computer-readable medium of claim 17, wherein the operations further include:

receiving, from each worker thread of the set of worker threads, a workflow task result and the token;

authenticating the workflow task result using the token.

20. The non-transitory computer-readable medium of claim 17, wherein the set of workflow tasks includes a quantity of workflow tasks that is based on a snapshot of worker thread availability.

* * * * *

UNITED STATES PATENT AND TRADEMARK OFFICE
CERTIFICATE OF CORRECTION

PATENT NO. : 11,630,692 B2
APPLICATION NO. : 17/703734
DATED : April 18, 2023
INVENTOR(S) : Mundra et al.

It is certified that error appears in the above-identified patent and that said Letters Patent is hereby corrected as shown below:

In the Specification

In Column 1, Lines 42-51, delete "receiving an indication of a processing delay that prevents the set of worker threads from completing execution of the set of workflow tasks; suspending execution of the set of workflow tasks by the set of worker threads; adding the set of workflow tasks to a temporary workflow task queue; executing, by subset of worker threads, a different task during the processing delay; determining that the processing delay has terminated; and resuming, in response to determining that the processing delay has terminated, execution of the set of workflow tasks by the set of worker threads." and insert the same on Column 1, Line 41, as a continuation of the same paragraph, therefor.

In Column 1, Line 57, delete "above" and insert -- above. --, therefor.

In Column 7, Line 48, delete "and or" and insert -- and/or --, therefor.

In Columns 9-10, Lines 64-67 (Column 9), 1-6 (Column 10), delete "The polling frequency value indicates a frequency in which poller 208 is to request workflows from server 212. The polling frequency value may indicate that poller 208 is to execute a request for new workflow tasks in regular intervals (e.g., every 'x' milliseconds), upon detecting the occurrence of a condition or event (e.g., when resources of execution environment are below a predetermined threshold, predetermined quantity of worker threads are available for execution, receiving user input, receiving input from another client device or server 212, or the like) or the like." and insert the same on Column 9, Line 63, as a continuation of the same paragraph, therefor.

In Column 9, Line 43, delete "like)." and insert -- 'like.' --, therefor.

In Column 10, Line 42, delete "operator." and insert -- 'operator).' --, therefor.

In Column 11, Line 14, delete "T" and insert -- 'i' --, therefor.

In Column 11, Line 15, delete "T" and insert -- 'i' --, therefor.

Signed and Sealed this
Thirteenth Day of February, 2024

Katherine Kelly Vidal
*Director of the United States Patent and Trademark Office*

In Column 11, Line 27, delete "T" and insert -- 'i' --, therefor.

In Column 11, Line 27, delete "where T" and insert -- 'where i' --, therefor.

In Column 12, Line 37, delete "212-2,-212-n)," and insert -- 212-2-212-n), --, therefor.

In Column 13, Line 53, delete "and or" and insert -- and/or --, therefor.

In Column 16, Line 17, delete "device." and insert -- device). --, therefor.

In Column 16, Lines 18-20, delete "Alternatively, the client device may transmit the result of the execution of each workflow task as the workflow tasks finish executing." and insert the same on Column 16, Line 17, as a continuation of the same paragraph, therefor.

In Column 16, Line 64, delete "like." and insert -- like). --, therefor.

In Column 18, Lines 48-51, delete "The compute instance 544 can communicatively couple the app subnet(s) 526 of the data plane mirror app tier 540 to app subnet(s) 526 that can be contained in a data plane app tier 546." and insert the same on Column 18, Line 47, as a continuation of the same paragraph, therefor.

In Column 20, Line 61, delete "NAT gateway 638." and insert the same on Column 20, Line 60, as a continuation of the same paragraph, therefor.

In Column 22, Lines 32-39, delete "SSH VCN 712 can be communicatively coupled to a control plane VCN 716 (e.g. the control plane VCN 516 of FIG. 5) via an LPG 710 contained in the control plane VCN 716 and to a data plane VCN 718 (e.g. the data plane 518 of FIG. 5) via an LPG 710 contained in the data plane VCN 718. The control plane VCN 716 and the data plane VCN 718 can be contained in a service tenancy 719 (e.g. the service tenancy 519 of FIG. 5)." and insert the same on Column 22, Line 31, as a continuation of the same paragraph, therefor.

In Column 23, Lines 17-27, delete "VM 766(1)-(N) can be communicatively coupled to a respective app subnet 767(1)-(N) that can be contained in respective container egress VCNs 768(1)-(N) that can be contained in respective customer tenancies 770(1)-(N). Respective secondary VNICs 772(1)-(N) can facilitate communication between the untrusted app subnet(s) 762 contained in the data plane VCN 718 and the app subnet contained in the container egress VCNs 768(1)-(N). Each container egress VCNs 768(1)-(N) can include a NAT gateway 738 that can be communicatively coupled to public Internet 754 (e.g. public Internet 554 of FIG. 5)." and insert the same on Column 23, Line 16, as a continuation of the same paragraph, therefor.

In Column 23, Lines 33-38, delete "Internet 754. Public Internet 754 can be communicatively coupled to the NAT gateway 738 contained in the control plane VCN 716 and contained in the data plane VCN 718. The service gateway 736 contained in the control plane VCN 716 and contained in the data plane VCN 718 can be communicatively couple to cloud services 756." and insert the same on Column 23, Line 32, as a continuation of the same paragraph, therefor.

CERTIFICATE OF CORRECTION (continued)
U.S. Pat. No. 11,630,692 B2

In Column 24, Lines 48-52, delete "VCN 818 (e.g. the data plane 518 of FIG. 5) via an LPG 810 contained in the data plane VCN 818. The control plane VCN 816 and the data plane VCN 818 can be contained in a service tenancy 819 (e.g. the service tenancy 519 of FIG. 5)." and insert the same on Column 24, Line 47, as a continuation of the same paragraph, therefor.

In Column 29, Line 39, delete "evolution)," and insert -- evolution)), --, therefor.